US009826335B2

(12) United States Patent
Cha et al.

(10) Patent No.: US 9,826,335 B2
(45) Date of Patent: Nov. 21, 2017

(54) METHOD AND APPARATUS FOR ENABLING MACHINE TO MACHINE COMMUNICATION

(75) Inventors: Inhyok Cha, Yardley, PA (US); Yogendra C. Shah, Exton, PA (US); Andreas U. Schmidt, Frankfurt (DE); Michael V. Meyerstein, Martlesham Heath (GB)

(73) Assignee: InterDigital Patent Holdings, Inc., Wilmington, DE (US)

( * ) Notice: Subject to any disclaimer, the term of this patent is extended or adjusted under 35 U.S.C. 154(b) by 431 days.

(21) Appl. No.: 12/863,009

(22) PCT Filed: Jan. 21, 2009

(86) PCT No.: PCT/US2009/031603
§ 371 (c)(1),
(2), (4) Date: Jun. 22, 2011

(87) PCT Pub. No.: WO2009/092115
PCT Pub. Date: Jul. 23, 2009

(65) Prior Publication Data
US 2011/0265158 A1    Oct. 27, 2011

Related U.S. Application Data

(60) Provisional application No. 61/022,127, filed on Jan. 18, 2008, provisional application No. 61/025,163, (Continued)

(51) Int. Cl.
*H04W 84/22* (2009.01)
*H04W 4/00* (2009.01)
(Continued)

(52) U.S. Cl.
CPC .............. *H04W 4/005* (2013.01); *H04L 9/08* (2013.01); *H04L 9/3234* (2013.01);
(Continued)

(58) Field of Classification Search
CPC ...... H04W 4/005; H04W 4/001; H04W 12/10
(Continued)

(56) References Cited

U.S. PATENT DOCUMENTS 6,731,932 B1 * 5/2004 Rune et al. ............... 455/432.1
6,779,120 B1    8/2004 Valente
(Continued)

FOREIGN PATENT DOCUMENTS

CN    1933651    3/2007
CN    101043338    9/2007
(Continued)

OTHER PUBLICATIONS

WO 2007/039757 A2 Fox et al., Telecommunications Networks, International Application published under PCT, Apr. 12, 2007, pp. 1-75.*
(Continued)

*Primary Examiner* — Ellen Tran
(74) *Attorney, Agent, or Firm* — Baker & Hostetler, LLP

(57) ABSTRACT

A method and apparatus for performing secure Machine-to-Machine (M2M) provisioning and communication is disclosed. In particular a temporary private identifier, or provisional connectivity identification (PCID), for uniquely identifying machine-to-machine equipment (M2ME) is also disclosed. Additionally, methods and apparatus for use in validating, authenticating and provisioning a M2ME is also disclosed. The validation procedures disclosed include an autonomous, semi-autonomous, and remote validation are disclosed. The provisioning procedures include methods for re-provisioning the M2ME. Procedures for updating software, and detecting tampering with the M2ME are also disclosed.

16 Claims, 6 Drawing Sheets

Related U.S. Application Data filed on Jan. 31, 2008, provisional application No. 61/031,630, filed on Feb. 26, 2008, provisional application No. 61/127,792, filed on May 14, 2008, provisional application No. 61/060,725, filed on Jun. 11, 2008, provisional application No. 61/141,569, filed on Dec. 30, 2008, provisional application No. 61/141,586, filed on Dec. 30, 2008.

(51) Int. Cl.
```
H04L 29/06      (2006.01)
H04W 12/06      (2009.01)
H04W 12/10      (2009.01)
H04L 9/08       (2006.01)
H04W 12/08      (2009.01)
H04L 9/32       (2006.01)
```

(52) U.S. Cl.
CPC .......... *H04L 63/0823* (2013.01); *H04L 63/12* (2013.01); *H04W 4/001* (2013.01); *H04W 12/06* (2013.01); *H04W 12/08* (2013.01); *H04W 12/10* (2013.01); *H04W 84/22* (2013.01)

(58) Field of Classification Search
USPC .................................................... 726/2, 3, 6
See application file for complete search history.

(56) References Cited

U.S. PATENT DOCUMENTS

| | | | |
|---|---|---|---|
| 7,017,155 B2 | 3/2006 | Peev et al. | |
| 7,027,808 B2 | 4/2006 | Wesby | |
| 7,558,966 B2 | 7/2009 | Durham et al. | |
| 7,580,701 B2 | 8/2009 | Ross | |
| 7,653,819 B2 | 1/2010 | Bade et al. | |
| 7,711,960 B2 | 5/2010 | Scarlata | |
| 7,725,703 B2 | 5/2010 | Hunter et al. | |
| 7,747,862 B2 | 6/2010 | Ovadia | |
| 7,752,465 B2 | 7/2010 | Ebringer et al. | |
| 7,809,777 B2 | 10/2010 | Dodge | |
| 7,853,804 B2 | 12/2010 | Cromer et al. | |
| 7,907,531 B2 | 3/2011 | Jha et al. | |
| 7,908,483 B2 | 3/2011 | Iliev et al. | |
| 7,930,733 B1 | 4/2011 | Iftode et al. | |
| 8,090,551 B2 | 1/2012 | Almonte | |
| 8,108,668 B2 | 1/2012 | Rozas | |
| 8,112,630 B2 | 2/2012 | Jung et al. | |
| 8,266,676 B2 | 9/2012 | Hardjono et al. | |
| 8,300,829 B2 | 10/2012 | Ekberg et al. | |
| 8,914,674 B2 | 12/2014 | Shah et al. | |
| 9,253,643 B2 | 2/2016 | Pattar et al. | |
| 2003/0119481 A1* | 6/2003 | Haverinen et al. | 455/411 |
| 2004/0023689 A1 | 2/2004 | Ahonen | |
| 2004/0153667 A1* | 8/2004 | Kastelewicz et al. | 713/201 |
| 2005/0033987 A1* | 2/2005 | Yan et al. | 713/201 |
| 2005/0111463 A1 | 5/2005 | Nepomuceno Leung et al. | |
| 2005/0132358 A1 | 6/2005 | Peev et al. | |
| 2005/0223007 A1 | 10/2005 | Zimmer | |
| 2006/0074600 A1 | 4/2006 | Sastry et al. | |
| 2006/0137022 A1* | 6/2006 | Kilian-Kehr et al. | 726/27 |
| 2007/0050678 A1 | 3/2007 | Estes et al. | |
| 2007/0075216 A1 | 4/2007 | Tohma | |
| 2007/0113120 A1 | 5/2007 | Dodge | |
| 2007/0143629 A1* | 6/2007 | Hardjono et al. | 713/189 |
| 2007/0150524 A1 | 6/2007 | Eker et al. | |
| 2007/0153793 A1 | 7/2007 | Jiang | |
| 2007/0157022 A1 | 7/2007 | Blom et al. | |
| 2008/0046786 A1 | 2/2008 | Patel et al. | |
| 2008/0076419 A1* | 3/2008 | Khetawat et al. | 455/435.1 |
| 2008/0076425 A1 | 3/2008 | Khetawat et al. | |
| 2008/0155673 A1 | 6/2008 | Jung et al. | |
| 2008/0163212 A1 | 7/2008 | Zimmer et al. | |
| 2008/0233963 A1 | 9/2008 | Alanara et al. | |
| 2008/0260149 A1* | 10/2008 | Gehrmann | G06Q 20/3821 380/247 |
| 2008/0301784 A1 | 12/2008 | Zhu et al. | |
| 2009/0013210 A1 | 1/2009 | McIntosh et al. | |
| 2011/0010543 A1 | 1/2011 | Schmidt et al. | |
| 2011/0041003 A1 | 2/2011 | Pattar et al. | |
| 2011/0044454 A1 | 2/2011 | Baek et al. | |
| 2011/0265158 A1 | 10/2011 | Cha et al. | |
| 2015/0099510 A1 | 4/2015 | Shah et al. | |
| 2015/0237502 A1 | 8/2015 | Schmidt et al. | |
| 2016/0044440 A1 | 2/2016 | Cha et al. | |

FOREIGN PATENT DOCUMENTS

| | | |
|---|---|---|
| EP | 1533695 | 5/2005 |
| EP | 2 076 071 | 7/2009 |
| JP | 2003-208316 | 7/2003 |
| JP | 2003-208404 | 7/2003 |
| JP | 2005-521928 | 7/2005 |
| JP | 2005-536934 | 12/2005 |
| JP | 2006-513609 | 4/2006 |
| JP | 2006-287339 | 10/2006 |
| JP | 2007-072909 | 3/2007 |
| JP | 2007-515708 | 6/2007 |
| JP | 2007-215235 | 8/2007 |
| JP | 2007-522695 | 8/2007 |
| JP | 2011-509575 | 3/2011 |
| JP | 2012-520024 | 8/2012 |
| KR | 10-2005-0051223 | 6/2005 |
| KR | 2006-0090263 A | 8/2006 |
| KR | 10-2006-0118464 A | 11/2006 |
| KR | 2007-0073642 A | 7/2007 |
| KR | 2007-0102722 A | 10/2007 |
| KR | 10-2008-0023841 A | 3/2008 |
| KR | 10-2009-0000065 | 1/2009 |
| KR | 10-2009-0091184 A | 8/2009 |
| WO | WO 02-056133 | 7/2002 |
| WO | WO 03-069922 | 8/2003 |
| WO | WO 2004-019582 | 3/2004 |
| WO | WO 2004-062248 | 7/2004 |
| WO | WO 2005-050441 | 6/2005 |
| WO | WO 2006-079419 A1 | 8/2006 |
| WO | WO 2007-110094 | 10/2007 |
| WO | WO 2008/001322 | 1/2008 |
| WO | WO 2008-082587 | 7/2008 |
| WO | WO 2008-125657 | 10/2008 |
| WO | WO 2009-082759 | 7/2009 |
| WO | WO 2009/092115 | 7/2009 |
| WO | WO 2010-102222 | 9/2010 |
| WO | WO 2010-102259 | 9/2010 |

OTHER PUBLICATIONS

3$^{rd}$ Generation Partnership Project (3GPP), S3-090159, "pCR for Text on Device Validation in the Conclusion Section", Nokia Siemens Network, 3GPP TSG SA WG3 Security, SA#54, Firenze, Italy, Jan. 19-23, 2009, 3 pages.

3$^{rd}$ Generation Partnership Project (3GPP), TR 33.812, V0.0.2, "3$^{rd}$ Generation Partnership Project; Technical Specification Group Services and System Aspects; Feasibility Study on Remote Management of USIM Application on M2M Equipment; (Release 8)", Oct. 12, 2007, 14 pages.

3$^{rd}$ Generation Partnership Project (3GPP), TR 33.812, V1.2.0, "3$^{rd}$ Generation Partnership Project; Technical Specification Group Services and System Aspects; Feasibility Study on Remote Management of USIM Application on M2M Equipment; (Release 8)", Nov. 1, 2008, 61 pages.

3$^{rd}$ Generation Partnership Project (3GPP), TR 33.820, V1.2.0, "3$^{rd}$ Generation Partnership Project; Technical Specification Group Services and System Aspects; Security of H(e)NB; (Release 8)", Dec. 2008, 67 pages.

TCG, "TCG Mobile Reference Architecture", Specification Version 1.0, Revision 1, Jun. 12, 2007, 87 pages.

TCG, "TCG Specification Architecture Overview", Specification, Revision 1.4, Aug. 2, 2007, 54 pages.

U.S. Appl. No. 14/699,509, filed Apr. 29, 2015, Schmidt et al.

(56) References Cited

OTHER PUBLICATIONS

U.S. Appl. No. 14/570,301, filed Dec. 15, 2014, Shah et al.
3rd Generation Partnership Project, 3GPP TR33.82,0 v8.3.0 Technical Specification Group Service and Systems Aspects; Security of H(e)NB; (Release 8), Dec. 2009.
3rd Generation Partnership Project, 3GPP TR 33.820 v1.3.0, Technical Specification Group Service and Systems Aspects; Security of H(e)NB; (Release 8), Jan. 2009.
3rd Generation Partnership Project, (3 GPP)TS 33.310 V9.1.0, "Technical Specification Group Service and System Aspects; Network Domain Security (NOS); Authentication Framework (AF)" (Release 9), Dec. 2009.
3rd Generation Partnership Project, (3GPP) TS.33.310 V8.2.1, "Technical Specification Group Service and System Aspects; Network Domain Security (NOS); Authentication Framework (AF)" (Release 9), (Mar. 2008).
3rd Generation Partnership Project, (3GPP) TS 33.234 V8.1.0, "Technical Specification Group Service and System Aspects; 3G Security; Wireless Local Area Network (WLAN) Interworking Security" (Release 8), Mar. 2008.
3rd Generation Partnership Project, (3GPP) TS 33.234 V9.0.0, "Technical Specification Group Service and System Aspects; 3G Security; Wireless Local Area Network (WLAN) Interworking Security", (Release 9), Sep. 2009.
3rd Generation Partnership Project, (3GPP) TR 33.812 V9.0.0, "Technical Specification Group Services and System Aspects; Feasibility Study on the Security Aspects of Remote Provisioning and Change of Subscription for M2M Equipment"; (Release 9), Dec. 2009.
3rd Generation Partnership Project, (3GPP) TR 33.812 V9.0.0, "Technical Specification Group Services and System Aspects; Feasibility Study on the Security Aspects of Remote Provisioning and Change of Subscription for M2M Equipment"; (Release 8) Sep. 2008.
3rd Generation Partnership Project, (3GPP) TS 32.583 V9.2.0, "Technical Specification Group Services and System Aspects; Telecommunication management; Home Node B (HNB) Operations, Administration, Maintenance and Provisioning (OAM&P); Procedure flows for Type 1 interface HNB to HNB Management System (HMS)", (Release 9), Dec. 2009.
3rd Generation Partnership Project (3GPP), TR 33.820 V1.3.0, 3rd Generation Partnership Project; Technical Specification Group Service and System Aspects; Security of H(e)NB; (Release 8), Jan. 2009, 75 pages.
3rd Generation Partnership Project (3GPP), TR 33.820, V1.2.0, "3rd Generation Partnership Project; Technical Specification Group Service and Systems Aspects; Security of H(e)NB"; (Release 8), Dec. 2008, 67 pages.
3rd Generation Partnership Project, "System Architecture of HNB (Release 8)", 3GPP TSG RAN WG3 Meeting, Sophia Antipolis, France, Jun. 11-12, 2008, 1 page.
3rd Generation Partnership Project: Technical Specification Group Service and System Aspects; Security of H(e)NB; (Release 8), 3GPP TR 33.820 V2.0.0, SP-090130.zip,URL, http://www.3gm2.org/ftg/tsg sa/TSG SA/TSGS 43/docs/, Mar. 4, 2009.
Gallery and Mitchell, "Trusted Mobile Platforms", Foundations of Security Analysis and Design, IV; Lecture Notes in Computer Science, Springer Berlin Heidelberg, Berlin, Heidelberr, Aug. 18, 2007, pp. 282-323.
Kaufman, "Internet Key Exchange (IKEv2) Protocol," Network Working Group, RFC-4306 Dec. 2005.
International Patent Application No. PCT/US2010/026384: International Search Report, dated Sep. 2, 2010, 15 pages.
International Patent Application No. PCT/US2010/026436: International Search Report, dated Sep. 2, 2010, 18 pages.
Pearson, et al. (Trusted Computing Platforms: TCPA Technology in Context by: Siani, Pub. Date: Jul. 22, 2002), Chapter 6, pp. 106-107.
Pearson, et al. Trusted Computing Platforms: TCPA Technology in Context by: Siani, Pub. Date: Jul. 22, 2002, p. 39.
Pearson, et al. Trusted Computing Platforms: TCPA Technology in Context by: Siani, Pub. Date: Jul. 22, 2002, Chapter 6, pp. 106-109.
Sailer et al, "Design and Implementation of a TCG-Based Integrity Measurement Architecture," Proceedings of the 13th USENIX Security Symposium, 2004.
Schmidt et al, "Trust for Location-Based Authorization," IEEE Communication Society, 2008.
Trusted Computing Platforms: TCPA Technology in Context, Siani Pearson, et al., Jul. 22, 2002, Prentice Hall; pp. 40,50,42,57 59,60,111'143,144,153,184,209.
Trusted Computing Challenges. AMD Presentation, Leendert van Doorn, Nov. 2007.
Trusted Computing Group et al, "TCG Specification Architecture Overview Passage", TCG Specification Architecture Overview, Trusted Computing Group, US, no. revision 1.2, Apr. 28, 2004.
Trusted Computing Group, "TCG Mobile Reference Architecture," Specification version 1.0, Revision 1, Jun. 2007.
U.S. Appl. No. 12/718,572: Non-final office action dated Jun. 21, 2012,15 pages.
U.S. Appl. No. 12/718,480: Final office action dated May 22, 2013, 15 pages.
U.S. Appl. No. 12/718,480: Final office action dated Sep. 27, 2012, 16 pages.
U.S. Appl. No. 12/718,480: Non-final office action dated Mar. 4, 2013, 17 pages.
U.S. Appl. No. 12/718,572: Final office action dated Dec. 19, 2012, 15 pages.
Van Dijk et al, "Securing Shared Untrusted Storage by using TPM 1.2 Without Requiring a Trusted OS. Technical Report", MIT CSAIL CSG Technical Memo 498, May 2007.
Yoshihama, "Platform Trust Based Access Control Framework," The 2006 Symposium on Cryptography and Information Security, 3B2 Access Control, 3B2-5, SCIS 2006 Organizing Committee, Japan, Jan. 17, 2006.
European Application No. EP 15 19 3998: Extended European Search Report dated Mar. 16, 2015, 9 pages.
Japanese Application No. 2015-011755: Notice of Rejection dated Jan. 12, 2016.
Korean Application No. 10-2015-7030014: Office Action dated Feb. 2, 2016, 5 pages.
3rd Generation Partnership Project, (3 GPP) TS 33.320, 9.0.0, 3rd Generation Partnership Project; Technical Specification Group Services and System Aspects; Security of Home Node B (HNB) / Home evolved Node B (HeNB) (Release 9), Dec. 2009, 31 pages.
Cabuk et al, "Improving Policy Verification Capabilities of Trusted Platforms", Jun. 21, 2008, 20 pages.
U.S. Appl. No. 12/718,480: Non-final Office Action dated Jun. 7, 2012, 20 pages.
Zheng et al, Secure DRM Scheme for Future Mobile Networks Based on Trusted Mobile Platform, IEEE, 2005, 11664-1167.
3rd Generation Partnership Project (3GPP) TS 33.320, 9.0.0, 3rd Generation Partnership Project; Technical Specification Group Services and System Aspects; Security of Home Node B (HNB) /Home Evolved Node B (HeNB) (Release 9) Dec. 2009, 31 pages.
Balfe et al, "Challenges for Trusted Computing", Research Workshop on Challenges for Trusted Computing at: 3rd European Trusted Infrastructure Summer school [ETISS Sep. 2008], Feb. 26, 2008, 1-24.
Korean Application No. 10-2015-7026996: Office Action dated Jun. 21, 2016, 1-4 pages.
3rd Generation Partnership Project (3GPP) TSG SA WG3 Security-S3#55, S3-090746, Shanghai, China, May 11-15, 2009, 4 pages, www.3GPP.org-/ftp/tsg_sa/WG3_Security/TSGS3_55_Shanghai/docs.
3rd Generation Partnership Project (3GPP) TSG-SA3-Security-SA3#57, S3-091947, Dublin, Ireland, Nov. 16-20, 2009, 4 pages, www.3GPP.org-/ftp/tsg_sa/WG3_Security/TSGS3_57_Dublin/docs.
Japanese Application No. 2015-159857: Notice of Rejection dated Sep. 6, 2016, 6 pages.
Korean Application No. 10-2014-7014163: Notice of Allowance dated Oct. 31, 2016, 1 page.

(56) References Cited

OTHER PUBLICATIONS

Lazouski et al, "A Survey of Usage Control in Computer Security", Dec. 2008, 21 pages.

3rd Generation Partnership Project (3GPP) TSG-SA WG3#49, S3-070900, Technical Specification Group Services and system Aspects; Feasibility Study on Remote Management of USIM Application on M2M Equipment; Release 8, Oct. 12, 2007.

Japanese Application No. 2015-011755: Notice of Allowance dated Jan. 10, 2017, 6 pages.

U.S. Appl. No. 14/699,509: Non-Final Office Action dated Jan. 26, 2017, 16 pages.

Park et al, "Trusted Computing Technology and TCG Standard Trend", ETRI, Electronics and Telecommunications Trends, 3(4), Aug. 2008, 13 pages, (No translation)—(This reference cited in the related Korean Appln. No. 10-2015-7026996, Notice of Allowance dated Jan. 24, 2017).

Korean Patent Application No. 10-2016-7032791: Office Action dated Mar. 17, 2017, 5 pages.

Korean Patent Application No. 10-2015-7026996: Notice of Allowance dated Jan. 24, 2017, 1 page.

Korean Patent Application No. 10-2017-7010662: Office Action dated Jul. 28, 2017, 4 pages.

Taiwan Patent Application No. 105132449: Search Report dated Sep. 1, 2017, 1 page.

\* cited by examiner

METHOD AND APPARATUS FOR ENABLING MACHINE TO MACHINE COMMUNICATION

CROSS-REFERENCE TO RELATED APPLICATIONS

This application is the National Stage of International Application No. PCT/US2009/031603 filed Jan. 21, 2009, which claims the benefit of U.S. Provisional Application No. 61/022,127, filed Jan. 18, 2008, U.S. Provisional Application No. 61/025,163, filed Jan. 31, 2008, U.S. Provisional Application No. 61/031,630, filed Feb. 26, 2008, U.S. Provisional Application No. 61/127,792, filed May 14, 2008, U.S. Provisional Application No. 61/060,725, filed Jun. 11, 2008, U.S. Provisional Application No. 61/141,569, filed Dec. 30, 2008, and U.S. Provisional Application No. 61/141,586, filed Dec. 30, 2008, the disclosures of which are incorporated herein by reference in their entireties.

FIELD OF INVENTION

The present invention is related to wireless communication.

BACKGROUND

Machine-to-Machine (M2M) Communication is a form of data communication between entities that, when deployed, do not necessarily require direct human interaction. One challenge of M2M Communication is establishing a protocol so that that deployed equipment may be managed remotely without any direct human interaction.

Existing M2M methodologies lack over-the-air protection of preliminarily configuration identifiers; they have do not utilize information on the Trusted State (TS) of the M2M-enabled equipment in authentication, registration, and provisioning of the equipment; they do not ensure a secure change of subscribed operators for M2M-enabled equipment; they do not ensure that the Authentication and Key Agreement credentials used in preliminary authentication of the M2M-enabled equipment is trusted; they do not provide for secure updating of software and firmware, or for reconfiguration of M2M-enabled equipment; and they do not detect and react to tampering with M2M-enabled equipment. Furthermore, the role of the M2M-enabled equipment user/subscriber lacks definition. Therefore, it would be advantageous to provide a method and apparatus for improving M2M performance, security and reliability.

SUMMARY

A method and apparatus for performing secure Machine-to-Machine (M2M) provisioning and communication is disclosed. In particular a temporary private identifier, or provisional connectivity identification (PCID), for uniquely identifying machine-to-machine equipment (M2ME) is also disclosed. Additionally, methods and apparatus for use in validating, authenticating and provisioning a M2ME is also disclosed. The validation procedures disclosed include an autonomous, semi-autonomous, and remote validation are disclosed. The provisioning procedures include methods for re-provisioning the M2ME. Procedures for updating software, and detecting tampering with the M2ME are also disclosed.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, a M2M equipment (M2ME), a Home NodeB or any other type of device capable of operating in a wireless environment. When referred to hereafter, the terminology "base station" includes but is not limited to a Node-B, a site controller, an access point (AP), or any other type of interfacing device capable of operating in a wireless environment.

Figure 1:
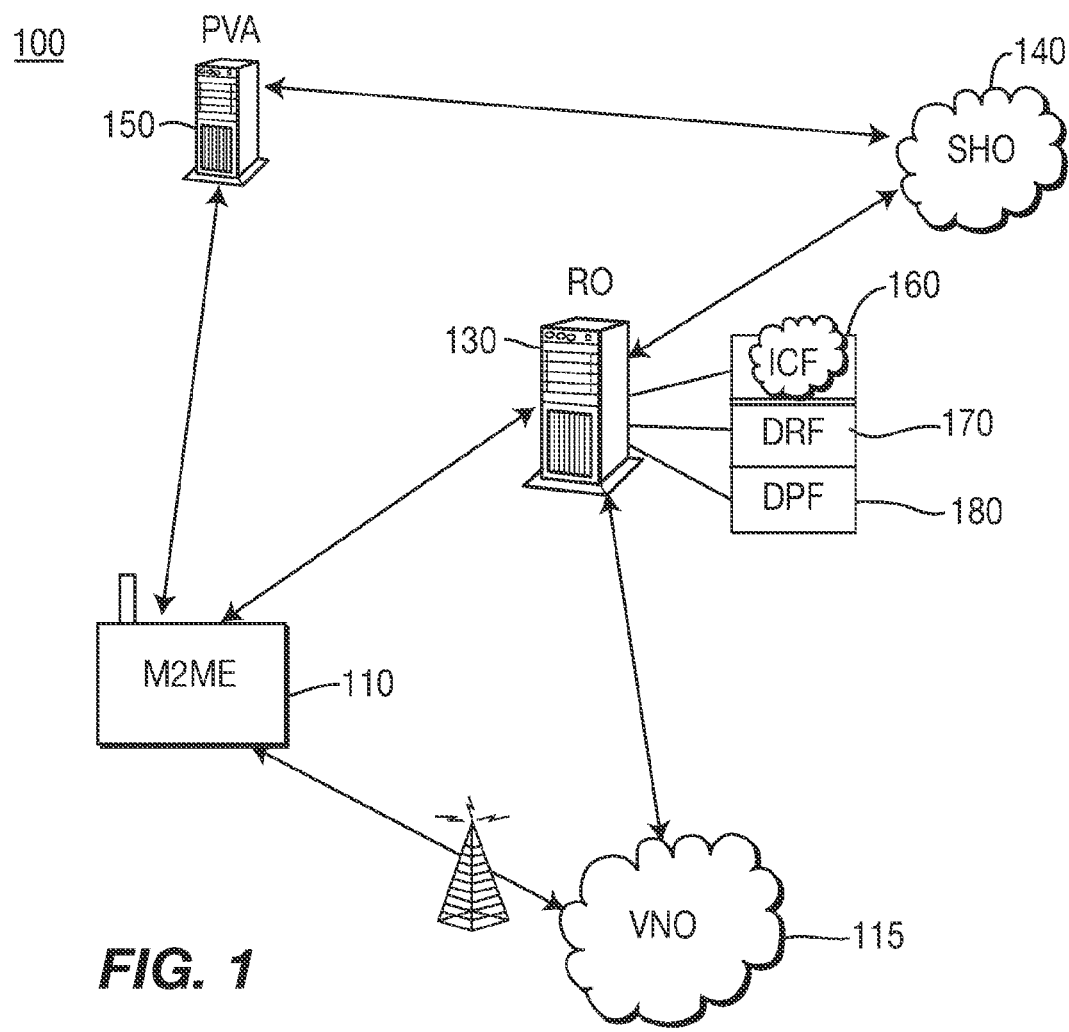
FIG. 1 shows an exemplary block diagram of a communication system for Machine-to-Machine (M2M) provisioning and communication.

FIG. 1 is an exemplary block diagram of a communication system 100 for Machine-to-Machine (M2M) provisioning and communication. The communication system 100 includes a M2M-enabled equipment (M2ME) 110, a visited network operator (VNO) 115, a registration operator (RO) 130, a selected home operator (SHO) 140, a platform verification authority (PVA) 150. The system 100 may also include an equipment manufacturer/supplier (E/S or ES) (not shown).

The VNO 115 is represented in FIG. 1 as a single network entity, however, all access networks that are accessed for the purpose of initial registration and provisioning of the USIM/ISIM applications are considered to be VNOs. If the M2ME 110 becomes registered for a different SHO, then the VNO 115 remains a VNO. If the M2ME 110 becomes registered to the SHO 140 that is currently the VNO 115, then the VNO 115 becomes the SHO.

The VNO 115 is responsible for providing temporary network access to M2ME 110 where access credentials and authentication may be required. This could be based on the temporary network access credentials such as a PCID or any other temporary private ID. Where it is considered permissible, the VNO 115 may provide open network access to the DRF 170, where no credentials or authentication are required for access to at least the services of the RO 130. For example, this function applies when the VNO 115 will become the customer's SHO after the registration and provisioning events. After registration and provisioning procedures have been implemented, the VNO 115 will provide full network (and IMS) access using the provisioned USIM/ISIM applications.

The RO 130 as shown includes an ICF (initial connectivity function) 160, a discovery and registration function (DRF) 170, and a downloading and provisioning function (DPF) 180. However, one of skill in the art would recognize that the ICF 160, DRF 170 and the DPF 180 could also be located in separate entities or collapsed into one entity.

The ICF 160 is the function or authority responsible for the validation of credentials that allow temporary access to communication networks for the purpose of registration and provisioning of operational network access. The functions of an ICF 160 include issuing of temporary network-access credentials and any temporary private identifier for each M2ME 110. These can be used for authenticating initial temporary network access to enable the USIM/ISIM application provisioning procedure to take place. The ICF 160 may also be configured to provision the M2ME 110 with downloadable M2M keys, configurations, and applications over the air for provisioning and reprovisioning procedures discussed in detail below.

The ICF 160 may also be configured to provide the terminal supplier to pre-configure the M2ME 110 with credentials, issued by the ICF 160. In order to provide these credentials, the ICF 160 must be configured to provide secure transmission of the credentials to the organization that is responsible for embedding them in the M2ME 110. The ICF 160 may also be configured to register the credentials in a database, and perform validation of the credentials when requested by a relying party. This could include the secure transmission of authentication vectors and/or other related data to the relying party. It should be noted, prior to successful registration of the M2ME 110 to the SHO 140, all access networks are considered as visited networks. This allows for transparent connectivity to the SHO 140 through a conventional network without any network changes.

The DRF 170 is the function that enables the after-purchase selection of a specific SHO 140 and registration of the M2ME 110 with that SHO 140. It may be an independent service, alternatively it may be operated by the SHO 140 whose RO 130 may be contactable only via the SHO's 3GPP network or may be contactable directly via the Internet and discoverable e.g. using functionality in the M2ME 110.

The DRF 170 should support at least the following usage-related functions: (1) allow the customer to select the SHO 140 after delivery of the M2ME 110 from a supplier; (2) allow the M2ME 110 to have an IP connection to the RO 130 using either temporary authenticated network access or limited open network access; (3) allow the M2ME 110 to request for a USIM/ISIM application provisioning to take place via a visited network operator as the M2ME 110 is not yet associated with any SHO 140; (4) approve the provisioning request and to authorize the DPF 180 to provision the M2ME 110; and (5) support registration of the M2ME 110 by the owner of the M2ME 110.

In order to support the usage-related functions described above, the DRF 170 may support association of the M2ME 110 with a SHO 140. Alternatively, the DRF 170 may be discoverable and addressable directly using the IP connectivity provided by the VNO's network. In either case, the DRF 170 must support validation, via the PVA 150, of the credentials which the M2ME 110 possesses as proof of the authenticity of its trusted environment (TRE) 230. The DRF 170 must also support a connection to the DPF 180 for authorization and audit. It should also be noted, validation can be not only of the credentials but also the TRE 230 and optionally the whole M2ME 110 if the TRE 230 so desires. For example, validation may include establishing the trustworthiness of the M2ME functions.

The DRF 180 may also support generation or obtainment of a package of data to be downloaded to the M2ME 110 such as USIM/ISIM credentials, files and executables. The DRF 180 may also be configured to transmit this data securely to the PS. Alternatively, these functions could be provided by the DPF 180.

Finally the DRF 180 may also facilitate the setting up of a security association between the M2ME 110 and the DPF 180. This may require the generation and transmission of security tokens over secure channels to the M2ME 110 and DPF 180.

The DPF 180 enables the remote provisioning of USIM/ISIM credentials to the M2ME 110. The functions of the DPF 180 include receiving authorization from the DRF 170 to provision the M2ME 110. This could include providing a security token for communicating with the M2ME 110. The DPF 180 is also responsible for receiving from the DRF 170 the application package to be downloaded. The DPF 180 may alternatively generate this from stored rules and advise the DRF 170 of the credentials that have been downloaded to the M2ME 110.

The DPF 180 is also configured to support the provisioning of a USIM/ISIM application or USIM/ISIM parameters to the M2ME 110 as is described below. In addition to provisioning, the DPF 180 may also be configured to perform future updates to a USIM/ISIM application or USIM/ISIM parameters to the M2ME 110 and future provisioning of new applications. Included with these functions, the DPF 180 may also be configured to notify the DRF 170 of a successful or unsuccessful provisioning event.

The SHO 140 is the network operator which has the commercial relationship with the customer, or end user of the M2ME 110 and is responsible for billing the customer. The SHO 140 may operate some or all of the other roles, especially DRF 170 and DPF 180, or they may all be separate commercial entities with an operational relationship with the SHO 140 and with each other.

The M2ME 110 initially is not commissioned to operate with a service provider and so in communication with the VNO 115 establishes a channel to the RO 130. In order to provision service, each M2ME 110 has its own temporary private identity, such as a PCID, which enables any VNO 115 to recognize the M2ME 110 and permit temporary access to the services it offers and to direct the initial connectivity messages to the appropriate network components, in order to download and provision service with an operator.

The PVA 150 is an authority responsible for credentials that attest to the authenticity of the secure device within the M2ME 110 that is used for storage and execution of downloaded USIM/ISIM applications. This function could be performed by one or more commercial organizations who issue credentials such as certificates and key pairs and who provide certificate validation services. The secure device could be a UICC, TRE, or some other form of secure module embedded in the M2ME 110. This function is required where strong authentication of the secure device is a prerequisite for provisioning of the USIM/ISIM applications. The PVA 150 may also provide functions such as creation and issuing of credentials to attest to the security of the secure device within the M2ME 110. However, it is also possible that this function could be performed by another entity. The PVA 150 may also provide functions such as validation of the credentials described above, when requested by a relying party using the requisite protocols. This could include the secure transmission of authentication vectors and/or other related data to the relying party. The PVA 150 may also provide functions such as maintenance of data relating to the validity of a device's issued credentials.

The equipment manufacture/supplier (E/S) (not shown) also plays a role in the communication system 100 of FIG. 1. Specifically, the M2ME 110 securely obtains credentials from the ICF 160 for authentication for the temporary initial network access. The E/S may also support re-configuration of the M2ME 110, prior to delivery to the customer, with those preliminary network-access credentials in order to allow temporary initial network access. Further, the E/S may obtain securely from a PVA 150 the credentials for use in proving to the DRF 170, via the ICF 160, that the M2ME 110 complies with a standardized set of security requirements. This activity may be contracted out to an approved organization with the required secure infrastructure.

The E/S may also be responsible for pre-configuration of the M2ME 110, prior to delivery to the customer, with the credentials. This pre-configuration activity may be contracted out to an approved organization with the required secure infrastructure. The E/S may also provide a means for the terminal owner to select the desired DRF 170 and SHO 140, or for this to happen automatically when the terminal is connected to an access network (AN).

Figure 2:
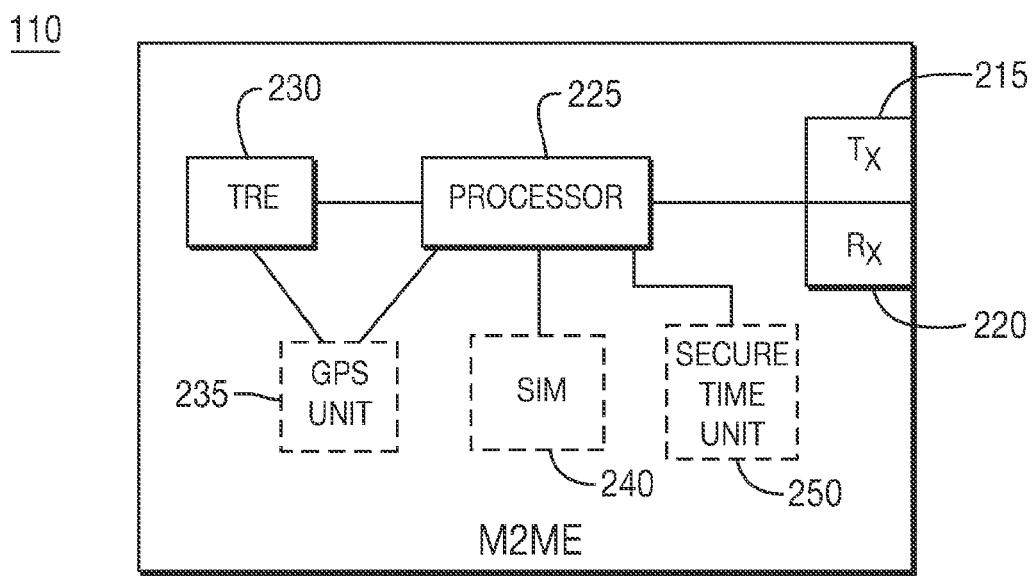
FIG. 2 shows an exemplary block diagram of a Machine-to-Machine equipment (M2ME)

FIG. 2 shows an example diagram of the M2ME 110 of FIG. 1. The M2ME 110 includes a transmitter 215, a receiver 220, a processor 225, a trusted environment (TRE) 230. Optionally the M2ME 110 may include a global positioning system (GPS) unit 235, a subscriber identity module (SIM) 240, and a secure time unit.

The M2ME 110 may be configured to support many different trust mechanisms such as the TRE 230, or any other trusted processing or storage mechanism such as a SIM 240 or ISIM. These trust mechanisms may also be more fully integrated into common AKA protocols to include the 'trust state' information and/or any keys protected by the TRE 230 in the M2ME 110, to protect any communication (not just transmission of the PCID) between the M2ME 110 and a network element before full AKA can take place and after authentication has been established.

Optionally, the SIM 240 may also be enhanced to include the functions of a trusted processing module (TPM) or mobile trusted module (MTM) to support the operations described above. Alternatively, the SIM 240 may operate closely with a TPM or MTM within the M2ME 110 to achieve the desired function. It should also be noted that the functionality of the SIM may also be achieved within the TRE 230. This allows greater flexibility in identity management.

Optionally, the M2ME 110 may be pre-provisioned with at least one AKA root secret that is installed by the E/S, one of which is active at any given time. The AKA root secret(s) may be protected by the SIM 240, and should never be changed. The SIM 240 may be configured to derive session keys from the active AKA root secret.

The M2ME 110 may also be configured to provide trust state information to the ICF 160. The trust state information may then be used for preliminary authentication when the M2ME 110 attaches to the VNO 115. The trust state information may also be used to derive session keys (CK and IK).

It should be noted that the TRE 230 functionality may be implemented exclusively on one component, or distributed between an embedded trusted component within the M2ME 110. Alternatively, the TRE 230 functionality may be implemented on a a removable SIM module.

An example of a formula to bind the PCR register value to the session key CKn and IKn, where n refers to the index for the most current update of the $CK_n$ and $IK_n$ may be:

$$CK_n = f3_K(RAND \| PCR0_n)$$

$$IK_n = f4_K(RAND \| PCR0_n) \qquad \text{Equation 1}$$

where $f3_K(\ )$ and $f4_K(\ )$ refer to the AKA key derivation functions for the cipher key and integrity key, respectively, out of the shared master secret K, RAND is the random nonce within the Authentication Vector (AV) generated by the CATNA and sent to, and thus shared by, the M2ME 110 in the AKA process, and $PCR0_n$ refers to the most current value of the PCR0 register inside an MTME on the M2ME 110. Note that the current value of PCR0 register signifies a description of the most recent post-boot trust status of the M2ME 110.

Note that according to Equation 1, the values of $CK_n$ and $IK_n$ change when and if the PCR0 values of the M2ME 110 changes between the two boots. In order for such a scheme to work, the ICF 160 must also be aware of the change of the PCR0 value (or more generally the 'trust state' of the M2ME 110 when there is a change in the post-boot trust state of the M2ME 110. This can be made possible if the ICF 160 is made aware of the schedule and substance of any legitimate or authorized update of the M2ME's OS, firmware or applications that affect the post-boot trust state of the M2ME 110. This may be done by involving the PVA 150 and/or the ICF 160 in the procedures described below. One can then ensure, following appropriate procedures, that the AKA ciphering and integrity keys shared between the M2ME 110 and the ICF 160 are updated and be made useful for authentication of the M2ME 110 in a way where the session keys reflect the most current 'trust state' value of the M2ME 110, thereby enhancing freshness and security of the AKA key derivation process.

It should be noted that other binding formulas than that of Equation 1 may be considered, as long as the session keys can be updated in the same way between the M2ME 110 and the ICF 160 and the update procedure itself at the M2ME 110 is performed in a trusted execution environment such as those provided by the use of Trusted Computing technologies.

The TRE 230 is a logically separate area in the M2ME 110 with hardware support for this separation. It is not necessarily a removable module, i.e. it can function within an IC or functions that are distributed across a group of ICs. The TRE 230 defines logical and physical interfaces to the outside world, which are usable only under control of an entity which is authorized to communicate directly with the TRE 230.

The TRE 230 provides a root of trust for the secure storage and secure execution environment for multiple manageable identities (MIDs) and for certain functions concerned with the provisioning and management of MIDs. The MID is a generic term for a full secure application and its associates parameters, credentials etc. It could incorporate any subscription management functionality such as a standard USIM application and keys, or other secure applications such as ISIM or secure payment applications. Hereinafter, MID may be used to refer to a manageable identity, subscription management identity, USIM application, ISIM application, virtual SIM (vSIM), or any other dynamic secure identity solution.

The TRE 230 may also be pre-provisioned in a secure, out-of-band facility with any required cryptographic keys and other credentials. Other security-critical functions of the TRE 230 are pre-provisioned onto the M2ME 110 in the same way. Further functionality may be typically provisioned by download after the M2ME 110 is issued.

The TRE 230 also provides a degree of protection against physical and logical attacks, supports and enforces its own security policy, and is sufficiently secure as to allow the storage and execution of MIDs that are currently implemented only in UICCs or other smart card platforms. The TRE 230 also has interfaces to parts of the M2ME 110 that are outside the TRE 230.

The TRE 230 has its own embedded, unique identity that is typically associated with the identity of the M2ME 110 that, where used, is also embedded in the TRE 230. As such, the TRE 230 may be configured to securely authenticate those identities to the issuing authorities using standardized protocols. The issuing authorities can then validate the TRE's identity as being that of a valid, issued, TRE 230 and M2ME 110. Each of those identities is embedded as part of a physically secure, out-of-band process that takes place before the M2ME 110 is issued.

The TRE 230 may be implemented in an embedded UICC with certain enhanced functionality, or alternatively as an integrated solution on the M2ME 110 utilizing hardware and software components provided by the M2ME 110. If the TRE 230 is implemented in an enhanced UICC, the TRE 230 would still support downloading and remote provisioning and management of MIDs and the functionality of the manageable identity engine (MIDE) within the TRE 230.

If the TRE 230 is implemented as an integrated solution in the M2ME 110, the M2ME 110 supports integrity checks of the software code and data that make up the TRE code base. TRE code should be checked at least once at power up/boot-time of the M2ME 110. Optional code checks could be conducted during operational use of the M2ME 110 as a background process at defined intervals or at certain triggers/events. Additionally, coverage of the code checks may be extended to cover a full or partial check of the M2ME 110.

In an alternative enhancement, the TRE 230 may include support for multiple isolated, trusted domains, each owned by a stakeholder-owner, within the TRE 230. Such domains could be isolated from each other, against tampering and unauthorized access and provide inter-domain services such as authentication and/or attestation functionality.

In some use cases, an M2ME 110 would operate in a dormant state for most of its deployment cycle and would connect to the 3G networks only sporadically or in frequently. In such a case, the run-time integrity checks of the TRE's software code may be made to take place during the dormant-state periods. In this manner, the code check would not interfere with other processes within the TRE 230 or the M2ME 110, and the result of a code check could be made to be ready when the M2ME 110 re-connects to the SHO 140.

Each M2ME 110 must be assigned a temporary private identity that is unique to the M2ME 110, the provisional connectivity identification (PCID). The PCID is a temporary private identity that uniquely identifies each M2ME. This PCID, where required, needs to be installed in the M2ME 110 by the ES in order to allow the M2ME to register in a 3GPP network before being associated with any specific SHO, such as SHO 140. The PCID is initially issued by an ICF 160, which sends the PCID to the ES with which it has a provisioning relationship. The ES then provisions the PCID into the TRE 230 of the M2ME 110. When a PCID is presented from the M2ME 110 to a VNO 115, the VNO 115 may recognize it as a having the format of the standard IMSI and then subsequently direct the M2ME 110 to a RO 130 to establish initial connectivity for provisioning.

In one embodiment, a single PCID may be valid for a limited time span (hereinafter a "validity period") that is enforced by the M2ME 110. The validity period may be controlled specifically by its TRE 230. Each M2ME device may receive a PCID and a validity period. After the time expires, the M2ME 110 may remove the PCID. The PCID can then be reused when another M2ME (not shown), which is provisioned with the same PCID, attempts to attach to the core network. The validity period of the second M2ME's PCID, however, should not, in general, overlap with that of the former M2ME's PCID.

After the first M2ME 110 has no use for the PCID again, typically the PCID may not be re-issued to a new M2ME until the exhaustion of the appropriate validity period for the M2ME 110.

In another embodiment, PCIDs may be systematically reallocated (without concurrent usage of PCIDs). This may cover the life-cycle of the M2ME 110. A limited number of PCIDs may be systematically preprovisioned to an M2ME 110. This may allow an autonomous management of initial network connectivity while exploiting the capabilities of the TRE 230. It is assumed that M2MEs are released in groups of size N. The M2MEs of the jth batch are referred to as $M\_i,j$ where $j=1, \ldots, M$. PCID assignment may be initialized with a matrix $(P)\_\{i,j\}$ of size N×M. M2ME 110 $M\_i,1$ gets column $P\_i,*$ loaded into the TRE 230 during manufacture. When the M2MEs are released, a secure timer or monotonic counter is initialized, activated and put under control of the TRE 230. The M2ME 110 of batch 1, i.e., $M\_i,1$, uses $P\_i,1$ for a determined time span T or a predetermined number of times based on the time or counter that was initialized. After the given time (validity period), the TREs of $M\_i,1$ discard $P\_i,1$ and use $P\_i,2$. It should be noted that the time span or number of usages should be such that the second batch is not yet released. The second batch $M\_i,2$, when released, also starts to use $P\_i,1$, which at this point in time, is freed by $M\_i,1$. Ideally, M×T covers the whole operation time of all M2MEs that need to be supported by the network.

This embodiment may allow the network to determine where a device is in a lifetime cycle. Previous PCIDs can be securely reassigned to new devices. The scheme exploits the intrinsic trust relationship of M2ME manufacturer with the TRE 230. Handling of the PCID column vector within the TRE 230 and enforcement of the time limits by the TRE 230 yields assurance toward the PLMN operator that concurrent use of PCIDs is prevented and the M2ME 110 has a valid PCID for use throughout its operation time.

However, this embodiment may impact the network operator, as the network operator may deliver the PCID sets to the manufacturer at a certain point in the manufacturing process, or install the PCID sets in a secure facility, before release. Also, the M2MEs may be preprovisioned with multiple PCIDs. The M2MEs may support reprovisioning of the later batches of PCIDs. Multiple M2MEs that share the same batch of the PCIDs at any given time may have 'chance' collisions where two or more M2MEs may choose the same PCID from the same batch and try to connect at the same time, resulting in 'PCID collisions'. The chances of PCID collisions may be smaller if the size of the batch (the size of the row, N) is made much larger than the number of M2MEs using the same batch of PCIDs and if the M2MEs choose the PCID to use in a random manner.

The management of PCIDs with time limits requires a synchronization of M2MEs' internal clocks within given precision limits. This must cover, for example, power-down events of a single M2ME 110, after which a resynchronization may become necessary. Therefore, the TRE 230 should hold and manage a time base and support synchronization with trusted time sources in the network. Optionally, the TRE 230 may rely on a trusted time source located in the M2ME 110, as is shown in FIG. 2.

An M2ME 110 may be equipped with autonomous geo-positioning equipment, such as a GPS 235. The M2ME 110 TRE 230 has secure access to the geo-positioning equipment.

The M2ME 110 can be distributed in different areas and arranged such that no two M2MEs may physically establish a radio connection to the same access network (AN) cell or base station at the same time. Multiple M2MEs thus can be preprovisioned with the same PCID but also a destination geo-position (D), the latter being unique to each M2ME, and a tolerance range (r). This data may be stored securely inside the TRE 230 or cryptographically secured so that only the TRE 230 is able to access the data.

Before an initial network access attempt by the M2ME 110, the TRE 230 determines the current geo-position and checks if it coincides with position D within the tolerance range r. If it does, the TRE 230 releases the PCID for initial network access. In this manner the AN may be assured that no two M2MEs will attempt access via the same cell using the same PCID.

Nonetheless, in some cases the AN may need to distinguish concurrent access attempts using the same PCID from different cells. Therefore it may need to keep record of (PCID, cell ID) pairs within the initial network connectivity service. Therefore, there can be some impact to the core network in this case.

In an alternative embodiment, access to the network by an M2ME 110 is permitted via predetermined network cells only. The predetermined network cells are identified by their network cell identifiers which are loaded into the M2MEs' TREs. They replace the pair (D,r).

In yet another alternative embodiment, M2MEs may be moved geographically. Network access is disabled when the M2ME 110 is moved. To enable M2ME mobility, the M2ME 110 can be preprovisioned with a set of triples (PCID, D, r) that designate the different places in which certain PCIDs may be used. Before initial network connection attempts of the M2ME 110, the TRE 230 checks if the current geo-position is within one of the ranges r of one of the destinations D and releases the corresponding PCID in the case of success.

Additionally, (PCID, D, r) triplets can be assigned a lifetime, i.e. a time span of allowed usage which is used and enforced as set forth above. The credential will be in a quintuple (PCID, D, r, t1, t2) where t1 and t2 designate the starting and ending times of the validity period. This describes a path for allowed movements of an M2ME 110. For example, the movements of an M2ME 110 can be controlled in a mobile deployment scenario such as in a vehicle. When the M2ME's TRE 230 is forced to reconnect frequently or otherwise use the PCID, a failure may be detected by a network service (in the form of a time-out) and be interpreted as the M2ME 110 leaving the determined path, thus causing an alarm.

The methods and apparatus set forth above may be insufficient to accommodate for mobility and/or PCID management requirements for the M2ME 110 throughout their lifetime. Therefore, a method to manage, i.e. reprovision and delete, (PCID, D, r, t1, t2) quintuplets is desirable.

Such quintuplets may be reprovisioned using a PCID update service (PUS). A PUS may identify the TRE 230 (uniquely corresponding to the M2ME 110) that it updates. The PUS may be part of the CCIF service or a separate component in the network. The update may include changes to one or more (PCID, D, r, t1, t2) quintuplets. The TRE 230 identity (ID) may be sent to a network service which can associate TRE IDs to a current network (IP) address. For example, a network entity may be a PVA 150 which has validated the integrity of the TRE 230 and M2ME 110 in the course of obtaining full network connectivity, or a Connectivity Credentials Issuing Function (CCIF) that works with the PVA 150 to confirm the validity of the M2ME 110, issue new PCID(s) and remotely provision the new PCID(s) to the M2ME 110. The remote provisioning may also be delegated to a DPF 170 in the network.

The repositioning procedure begins when the PUS connects to the target M2ME 110 and TRE 230 and requests a validation of its state, e.g. via a platform validation procedure described below and shown in FIGS. 3-5. This may indicate to the PUS that the TRE 230 will safely discard the old (set of) (PCID, D, r, t1, t2) quintuplets and install the desired new ones. Upon a validation success, the PUS may deliver a new (PCID, D, r, t1, t2) quintuplet and a list of old ones to be discarded. The TRE 230 autonomously installs the new quintuplet and (to ensure continued connectivity) discards the old ones.

In another embodiment, a TRE 230 may be capable of producing (pseudo-) random numbers which can be adjoined with PCIDs to alleviate collisions. The AN may be enabled to keep track of and distinguish between the additional information.

Communicating entities are the M2ME 110, TRE 230 and a network access point (NAP) (not shown). The NAP may be, for example, an eNodeB (eNB) associated with the VNO 115. The TRE 230 generates a random number (RAND) to be used in a single initial network connection attempt. The TRE 230 applies an integrity protection method, such as a keyed hash function where RAND enters a second parameter, for example, additional data as needed (D1), and a PCID. The TRE 230 sends this data as: TRE→eNB: RAND||PCID||D1||M1:=MAC(PCID||D1, RAND).

The eNB verifies the message authentication code (MAC) and builds a return package out of payload data (D2) and the received data as: eNB→TRE: D2||M2:=MAC(PCID||D2, M1, and sends it to TRE.

This method extends to all subsequent messages exchanged in the initial network connection. Subsequent message exchanges will include a MAC of a data element that includes any new message element and the immediately previous exchange's MAC. The eNB and the TRE 230 can distinguish messages during this communication using the last value $M_{n-1}$ to build the new $M_n$.

To avoid man-in-the-middle type attacks on this communication, a preestablished, or negotiated/shared secret may be included in the messages for authentication of the communicating parties.

The inclusion of the PCID proper in the MAC values is optional, but can be advantageous to build a hash table and to efficiently distinguish concurrent active network connection attempts of multiple M2MEs with different and/or common PCIDs. This may prevent the sending of the PCID (possibly in clear text) in every message of the initial network connection communication, which can be a security issue.

The eNB may keep a table representing the state of all concurrently active network access attempts (hereafter called channels) using PCIDs. For each channel, it contains the information in TABLE 1.

TABLE 1

| PCID index | Active hash value | Data history |
|---|---|---|
| I | $M_2$ | RAND, $D_1$, $D_2$ |

The first column contains an index of the PCID belonging to this particular channel, pointing to an entry in the list of all PCIDs currently active for all channels PL:=[PCID1, . . . PCIDN]. This saves memory on the above table, but if memory is not an issue, the column can contain the full PCIDs.

The eNB receives the third message on a channel:
TRE→eNB: $D_3 \| M_3 := MAC(PCID \| D_3, M_2)$ For i=1, . . . , N until success of the following procedure, the eNB selects $PCID_i$ from PL. For all table rows with PCID index I in the first cell, the eNB calculates $M := MAC(PCID_i \| D_3, M_2)$, wherein $M_2$ is taken from the second cell in the row. If $M=M_3$, success state is reached and the search procedure ends. The row number of the channel corresponding to the last received third message is returned. $D_3$ is added to the data history and $M_2$ is replaced by $M_3$ in the active hash value cell of the selected table row. This process is iterated for all subsequent communication steps.

Alternatively, instead of the PCID, messages after the first message could contain the index I of the channel to find the associated channel of a subsequent message even more efficiently.

In cases where resources, in particular memory, of the M2ME 110 and/or the eNB are limited, active PCIDs may be locked. This may be advantageous by preventing the M2ME 110 from using a locked PCID.

For example, a M2ME 110 has opened a channel with an eNB for a PCID. A second M2ME, (not shown) having a second TRE (not shown) attempts to open a channel to the eNB using the same PCID, while the first channel is still open. The eNB may respond to the first message of the second M2ME's TRE by transmitting $M_1$. Thus the second TRE is notified that this PCID is currently occupied. The second TRE may use another PCID from a pool of installed PCIDs for another channel opening attempt, or may wait a predetermined time span before using the same PCID again.

Alternatively, PCIDs may be actively deallocated by the involved entities. The M2ME's TRE 230 may discard a used PCID when it has been used for obtaining full network connectivity, (i.e. after download of the pertinent credentials). Various events may cause the discarding of a PCID. For example, discarding the PCID can be triggered if the TRE 230 has reached a state in which full network connectivity is assured such as by a successful run of a protocol for that purpose. Discarding the PCID can be triggered if a validity period has expired, if a network entity such, as the eNB, security gateway, or a dedicated PCID management entity, forces the discard, or if an entity outside the network, such as the manufacturer of the M2ME 110, forces the discard, which may establish a secure connection through the VNO 115 to the M2ME 110.

Regardless of what event triggers the discard, information about the event can be used to de-allocate it properly, that is, free it for reuse by other M2MEs. A connection may be established from the TRE 230 to the manufacturer of the M2ME to signal the deallocation event. The manufacturer may update the running list of free PCIDs and can reuse them to impress PCIDs on new M2MEs upon release.

Alternatively, an entity in the network such as the ES, the existing SHO 140, a new SHO not shown or the ICF 160 may be configured to update the PCID, in order to facilitate future connectivity operations upon for example initiation of a change of subscription from one SHO to another SHO. Once the M2ME 110 has been provisioned, an updated value for the initial network access credential, PCID could be delivered as a MID to the M2ME 110 for future use in assisting with provisioning service with a new SHO. The credentials would be extracted, stored, and used exclusively in the TRE 230 of the M2ME 110.

Before a credential re-provisioning process due to change of SHO, the M2ME 110 may be informed that its existing initial network access credential, PCID has either expired or is about to expire. The M2ME 110 may request and receive a new initial network access credential from the E/S, existing SHO 140, new SHO or the ICF 160. Alternatively, the M2ME 110 may receive a new PCID from one of these network components, sourced from the E/S or from a new SHO, so that it could route the M2ME 110 to the new SHO when the M2ME 110 makes a new initial network access attempt from a pristine state.

In one embodiment, the M2ME 110 may be pre-configured with the U(I)SIM application, a PCID, and more than one set of AKA root secrets, which are to be used one active set at a time. Upon change of the PCID, the M2ME 110 is instructed to use the next set of AKA credentials so that these may be used to provide 3GPP connectivity to the M2ME 110, thus facilitating a change of operator and subscription re-provisioning to a new SHO.

The above describes just a few of the possible methods for replacement of the initial network access credential and re-provisioning service. It should be noted, that consideration of security in all deallocation processes requires that a PCID is not to be transferred in clear text in deallocation processes. Further, for all deallocation processes, communication partners should be authenticated in deallocation processes.

There are three fundamentally different possibilities for performing validation or authentication of the trust state of the TRE 230, or the M2ME 110 and the associated data and credentials. The possibilities include: (1) autonomous validation; (2) semi-autonomous validation; and (3) remote validation. Each will be discussed in more detail below with reference to the architecture shown in FIG. 1.

Autonomous validation is a procedure whereby the internal validation of the M2ME 110 is assumed to have occurred before the M2ME 110 will allow itself to undergo network attachment.

A semi-autonomous validation is a procedure whereby the validity of the M2ME 110 is assessed within the M2ME 110 itself without depending on external network entities. The result of such validation and required evidence of the binding of authentication of the TRE 230 to the validity of the M2ME 110 is signaled to a remote entity such as the PVA 150, which makes a decision based on the content of the messages from the M2ME 110. The signaling from the M2ME 110 to the PVA 150 should be protected.

A remote validation consists of procedures whereby an external network entity (e.g. the PVA 150) directly assesses the validity/integrity of the M2ME 110 after it receives evidence for the validation generated by the M2ME's TRE 230, as well as evidence of binding between the TRE 230 and the M2ME 110. The communication taking place between the M2ME 110 and the PVA 150 for remote validation should be protected.

If the TRE 230 performs autonomous validation of the integrity of the M2ME 110, no direct evidence of the validation is provided to the outside world. The outside world assumes that, due to the way in which M2MEs and TREs are specified and implemented, an M2ME 110 which fails its internal integrity checks will be prevented by its TRE 230 from attaching itself to a network or from obtaining an authenticated connection to a remote entity. For example, the process of secure boot facilitates a secure bring up of the code in a M2ME 110 but there is no external signaling that this is the case other than reliance on the equipment fulfilling this purpose.

Figure 3:
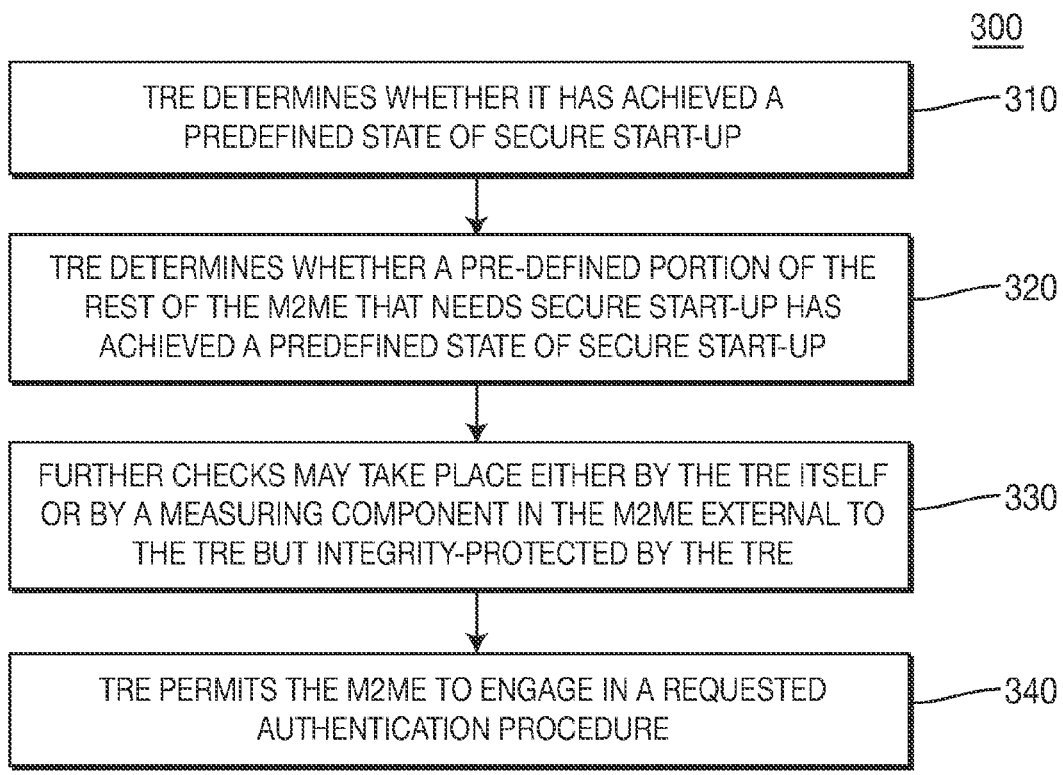
FIG. 3 shows an example flow diagram of a procedure for autonomous validation.

FIG. 3 shows an example of autonomous validation procedure 300 performed by the TRE 230 to validate the integrity of the M2ME 110.

First, the TRE 230 checks if it has achieved a predefined state of secure start-up, at 310. Next, the TRE 230 checks if a pre-defined portion of the rest of the M2ME 110 that needs secure start-up has achieved a predefined state of secure start-up, at 320.

Further checks may then take place either by the TRE 230 itself or by a measuring component in the M2ME 110 external to the TRE 230 but integrity-protected by the TRE 230, at 330. In such later-stage checks, integrity of other components, configurations, or parameters of the rest of the M2ME 110 is checked when they are loaded or started, or at other, pre-defined run-time events, wherever such is available to the measuring component.

Finally, the TRE 230 permits the M2ME 110 to engage in a requested authentication procedure, at 340.

Autonomous validation is the most economic method in terms of external communications required. However, autonomous validation does not permit any outside entity to independently assess the integrity of the TRE 230 or the M2ME 110 during network access or during a phase of uninterrupted connectivity. That is, the trustworthiness of the M2ME 110, as viewed by the network or other communication partners, rests solely on the technical specification of the security properties of the M2ME's TRE 230, as in the case of simple smart card based authentication.

Therefore, the TRE 230 may also store a log of the validation process and its results in response to every event of autonomous validation (e.g., before a network access attempt). For example, the stored measurement log and the Platform Configuration Register (PCR) values may be stored and used to protect the integrity of the M2ME 110 using trusted computing group principles.

This stored data may also be used for external audits since the data constitutes an audit record. The audit data is stored in a secure internal archive, either within the TRE 230, or protected by the TRE 230, such that it cannot be altered without such tampering being detectable. As a result, integrity protection of the data is provided.

Furthermore, the audit data is bound to the specific purpose for which autonomous validation was invoked (e.g., the specific instance of the run of a network access protocol). This may be accomplished by including data which uniquely identifies the validation purpose in the audit data.

For example, shared secrets or credentials established in the access protocol may be attached to the audit data and a digital signature can be applied by the TRE 230 to the produced data set to protect its integrity. An entity independent of the M2ME 110 may then request the audit data at any later point in time. For instance, the entity may request the audit data periodically to establish whether the M2ME 110 in question is trustworthy at every earlier network access event. This evidence together with identity credentials for the TRE 230 and M2ME 110 may then be counter-checked with network-side protocols about network access attempts to further validate the identity and trustworthiness of the TRE 230 and to detect tampering of the M2ME 110.

Figure 4:
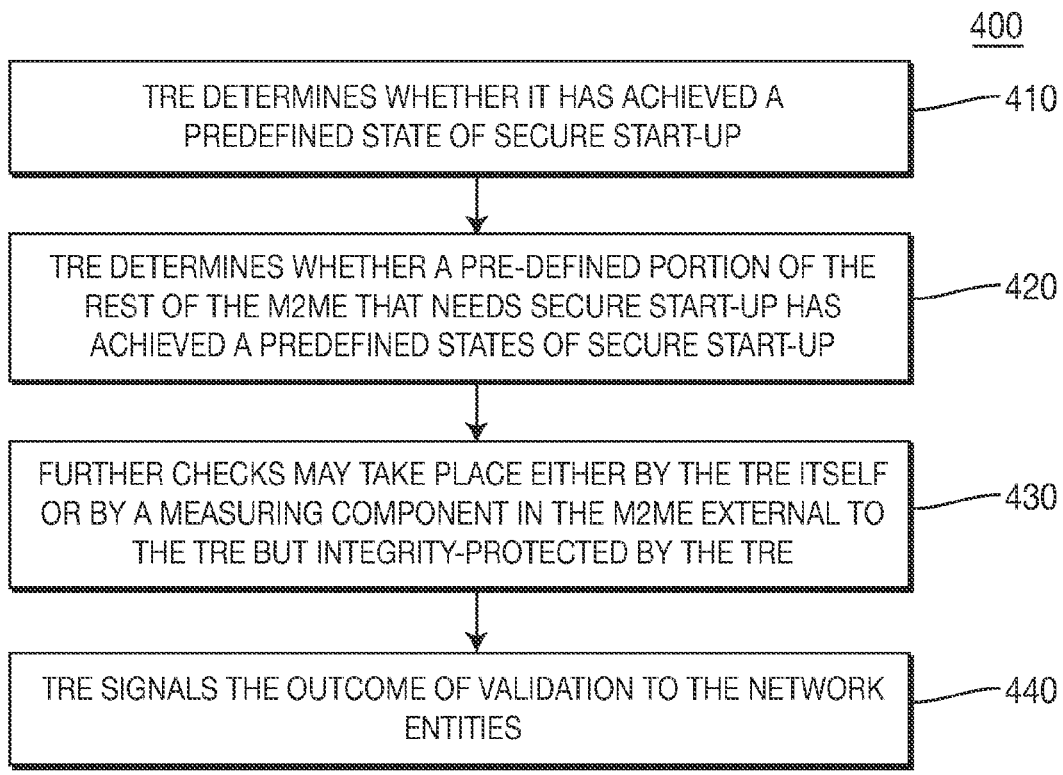
FIG. 4 shows an example flow diagram of a procedure for semi-autonomous validation.

FIG. 4 shows a procedure 400 for the TRE 230 to perform a semi-autonomous validation of the integrity of an M2ME 110. When the procedure 400 begins, the TRE 230 checks if it has achieved a predefined state of secure start-up, at 410. Next, the TRE 230 checks if a pre-defined portion of the rest of the M2ME 110 that needs secure start-up has achieved a predefined state of secure start-up, at 420. Then, further checks may take place either by the TRE 230 itself or by a measuring component in the M2ME 110 external to the TRE 230 but integrity-protected by the TRE 230, at 430. In such later-stage checks, integrity of other components, configurations, or parameters of the rest of the M2ME 110 is checked when they are loaded, started, or at any other, pre-defined, run-time time event that is available to the measuring component.

The remote entity such as PVA 150 may become indirectly aware of the fact that the M2ME 110 has passed a semi-autonomous validation test. There is explicit signaling to the network of the outcome of the validation. This signaling should originate from within the TRE 230 and should be protected cryptographically, at 440. Furthermore, the signaling precedes the M2ME 110 authentication required for MID download to ensure the integrity of the M2ME 110 component that is the target of the download. The signaling may also include evidence of the binding between the TRE's authentication and the resources in the M2ME 110 used for actual validity checking. Such evidence may include a token sent from the M2ME 110 to the network that provides further information for establishing certification of the TRE 230 and the M2ME 110.

Figure 5:
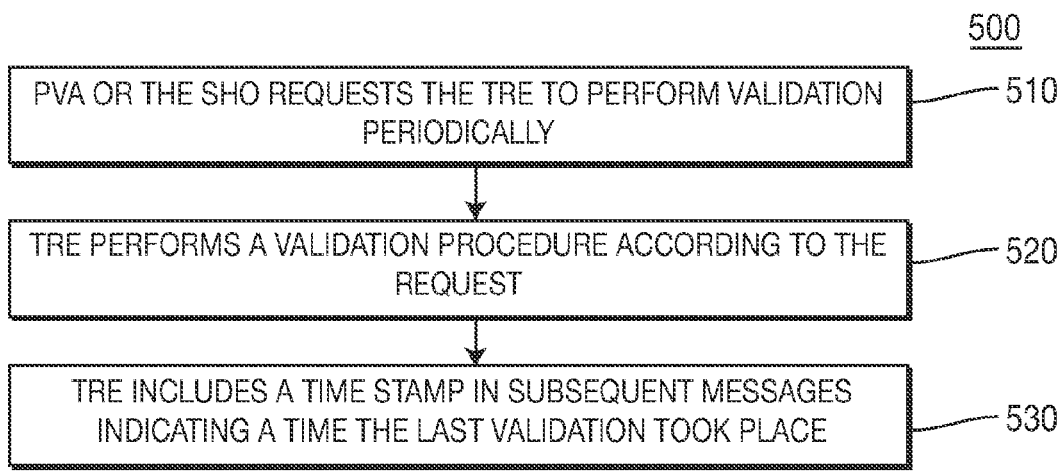
FIG. 5 shows an example flow diagram of another procedure for semi-autonomous validation.

FIG. 5 shows an alternative procedure 500 for semi-autonomous validation of the integrity of the TRE 230. The procedure 500 begins when the PVA 150 or the SHO 140 requests the TRE 230 to perform validation periodically, at 510. The request may be sent after the M2ME 110 is first registered or the request may be sent once the M2ME 110 is authenticated for the very first time with the SHO.

Alternatively, the request may be sent periodically as a protected operation and maintenance (OAM) message from the PVA 150 or SHO 140. The period of a 'periodic re-validation' may be relatively long but still short enough to make the SHO 140 feel safe about the 'freshness' of the validation.

Next the TRE 230 performs a validation procedure based on the request, at 520. Upon successful validation, the TRE 230 sends a validation response message to the PVA, which may include a time-stamp made by the TRE 230 indicating when the last validation took place, at 530. Alternatively, the TRE 230 may send a message stating that the last validation took place before the expiry of the current round of periodic validation cycle.

It should be noted that there is no explicit signaling about the 'outcome' of the validation, just some indirect indication, as part of the authentication request, indicating that the prescribed periodic validation really took place. This indication may be in the include the date or time when this was carried out.

Figure 6:
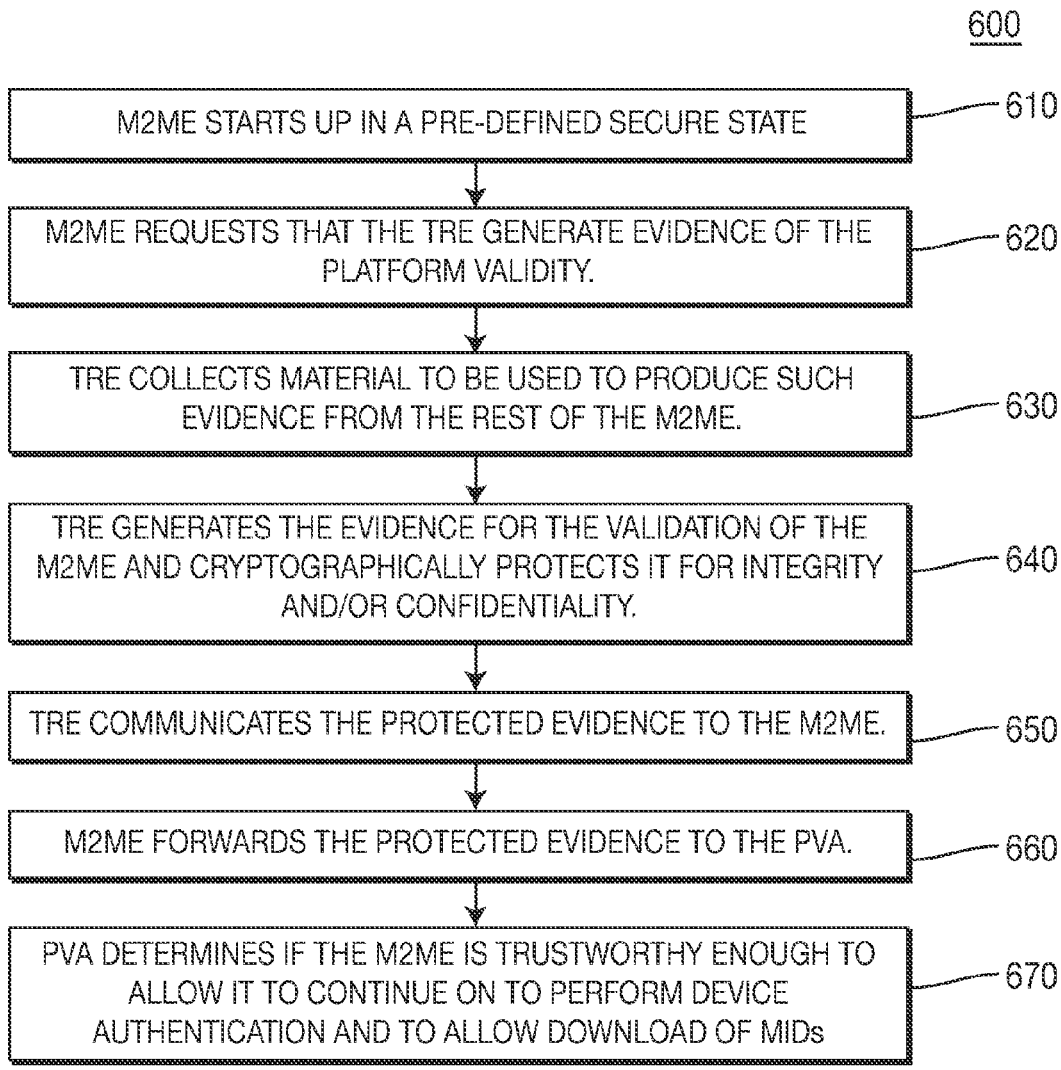
FIG. 6 shows an example flow diagram of a procedure for remote validation.

FIG. 6 is an example of a procedure 600 for remotely validating an M2ME's integrity. To begin the procedure 600, the M2ME 110 may start up to a pre-defined secure state, at 610. Upon achieving a secure state, the M2ME 110 may request that the TRE 230 generate evidence of the platform validity, at 620. Next, the TRE 230 collects material to be used to produce such evidence from the rest of the M2ME 110, at 630. For example, the material may include security-critical executable code in the M2ME 110, credentials for the M2ME's operation system (OS), equipment IDs, etc. Then, the TRE 230 generates the evidence for the validation of the M2ME 110 and cryptographically protects it for integrity and/or confidentiality, at 640. Next, the TRE 230 passes the protected evidence to the M2ME 110, at 650. The M2ME 110 forwards the protected evidence to the PVA 150, at 660.

Upon receipt of the protected evidence, the PVA 150 evaluates the evidence and determines if the M2ME 110 is trustworthy enough to allow it to continue on to perform device authentication and to allow download of MIDs, at 670.

Optionally, some of the elements of the procedure described above may be integrated with the process used for the M2ME authentication that is a prerequisite for the download of a MID. It should be noted, that the communication between the TRE 230 and the PVA 150 should be protected.

After any of the three validation procedures described above are performed, a binding between M2ME validation and authentication is desirable in many scenarios. In the case of an autonomous validation, the validation may be some certificate or credential of the M2ME 110 which attests to the secure state of the M2ME 110. In the case of the other validation procedures, the validation may include more secure means of certification of the secure state of the M2ME 110. Because the M2ME's TRE 230 is the trusted environment that assures the security properties of the M2ME-internal resources used to perform validation of the M2ME 110, there should be a binding of the credentials and/or outcomes of validation to credentials used for authentication.

There are three procedures for authenticating a M2ME 110. First, as a prerequisite for initial network connectivity, a pristine M2ME 110 may be authenticated by the ICF 160. Second, as a prerequisite for the download of a MID (e.g. a USIM application with its credentials), an M2ME 110 may be authenticated by an entity such as the DPF 180 to prove that it contains an authenticated TRE 230. Third, for operational network access (e.g., using a downloaded MID), the M2ME 110 may be authenticated by the SHO 140.

Autonomous validation is the only type of validation that may be bound to the authentication procedures that are used for initial network connectivity, as described above. The other two validation methods described above require involvement of the PVA 150 but there is no initial connectivity and it is not possible for the M2ME 110 to engage the PVA 150 for validation.

For initial network connectivity, the binding of integrity/validity to network access authentication may only be implicit for autonomous validation because no network-based checks of integrity/validity are performed until after network attachment has occurred. For the other two forms of validation, tokens (such as a digital certificate attesting to the credentials and certification of the TRE 230) can be passed in the initial attachment messages which provide further information on the identity of the TRE 230 within the M2ME 110 and hence the security functionality of the TRE 230 and integrity of the M2ME 110.

For operational connectivity, there may be semi-autonomous validation as well as remote validation. Further, there may be binding of such validation methods to the subsequent authentication steps. Two ways for achieving the binding of the platform validation and the authentication are described below.

First, there may be a logical binding of the TRE 230 holding the authentication credentials to the M2ME 110. During the authentication, the integrity of the device platform is validated. It should be noted that earlier solutions on logical binding (e.g., SIM-lock) have been circumvented quickly. However, there are other, newer methodologies that may be successfully applied such as TCG.

Second, there may be a physical binding of the TRE 230 to the M2ME 110. During the TRE 230 authentication, the integrity of the device platform is validated.

In both cases above, the actual validation of the platform resources should be performed either by using functionality of a hardware security component securely embedded into the M2ME 110 (i.e., the embedded TRE) or by using such hardware security components that may be outside of the TRE 230 but whose security properties are assured by the TRE 230 and which have a secure connection to the TRE 230. It should be noted, that the credentials and the application used for 3GPP AKA authentication are not designed for the purpose of validating the binding of a secure hardware component in the hosting device.

The steps of validation and authentication may be combined in a session of a common protocol. For example, the 3GPP uses the IKEv2 as a method to combine authentication steps for a device and a hosting-party. The same protocol may also be considered for use in a combined validation/authentication procedure.

Figure 7:
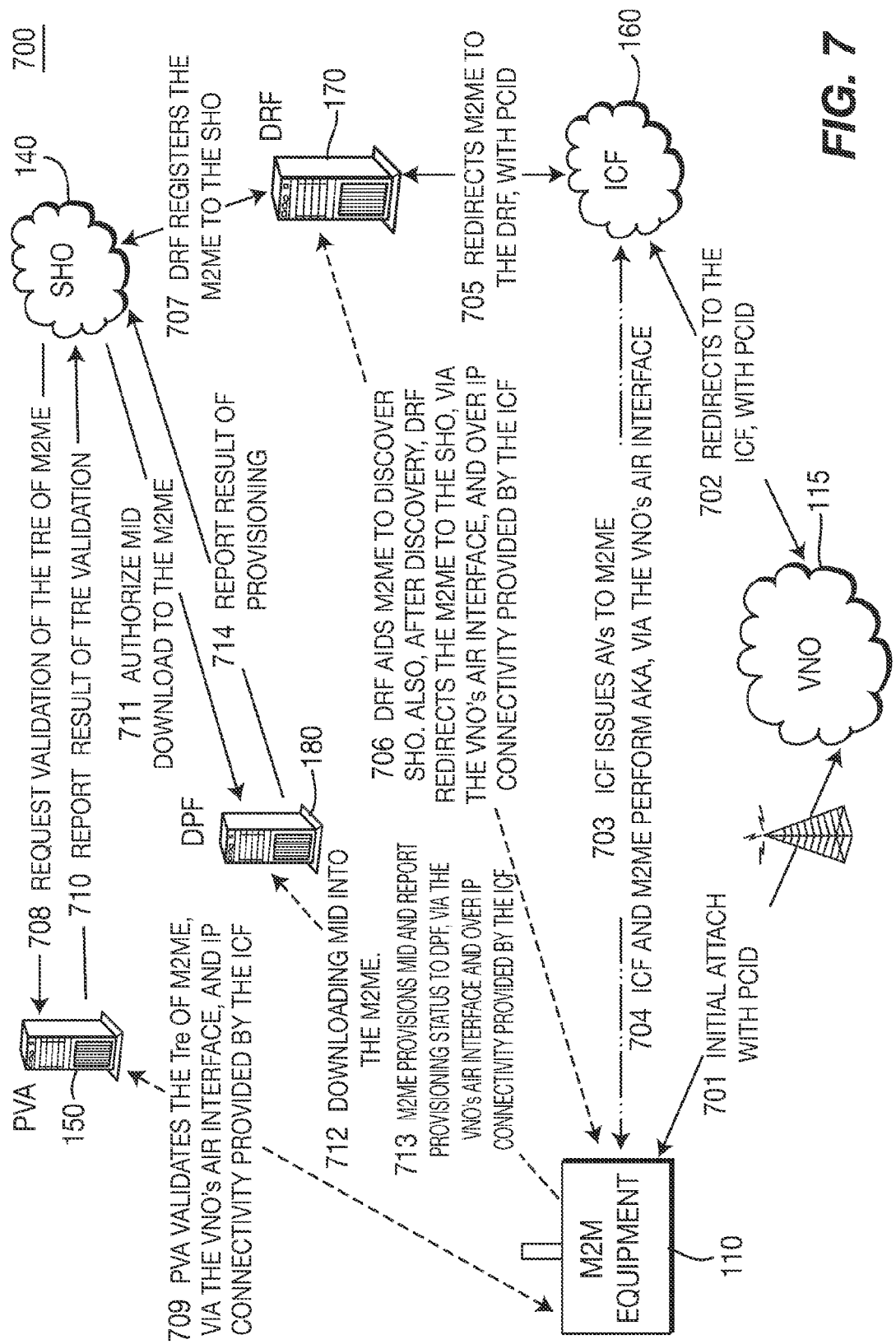
FIG. 7 shows an example procedure for provisioning or re-provisioning of an M2ME.

FIG. 7 shows a first example procedure 700 for provisioning and re-provisioning of a MID to the M2ME 110 in case of authenticated access. While this procedure is provided for purposes of example, other interactions between network entities, are possible with a similar result. In FIG. 7, arrows indicate connections between the functions, service providers, and validation authorities. A solid arrow indicates the air interface for the initial network access from the M2ME 110 to the VNO 115, the dashed arrows indicate the connections between the M2ME 110 and the ICF 160 via the air interface provided by the VNO's network, and the dotted arrows indicate the connections between the M2ME 110 and the DPF 180, DPF 170 and the PVA 150, over the air interface of the VNO's network and the IP connectivity provided by the ICF 160. While the ICF 160, DRF 170, and DPF 180, are all shown as individual entities, one of skill in the art would recognize that they could also be located within in one single entity as shown in FIG. 1 or in some other arrangement which achieves essentially the same functionality.

In the procedure 700 of FIG. 7, the downloading and provisioning of MID to a M2ME 110 may occur when the M2ME 110 accesses a 3G VNO's network in its initial network access. The VNO 115 provides an air interface to the M2ME 110 according to the following procedure.

The M2ME 110 may use the standard GSM/UMTS principle (GPRS/PS), for example, to decode network information and attach to the network of the VNO 115 using an attach message. In the attach message, the M2ME 110 sends a provisional M2ME ID, or PCID to the VNO 115 and the M2ME 110 is authenticated by the standard UMTS AKA procedure by the VNO 115, at 701. The content and structure of the PCID is such that the VNO 115 recognizes it as an IMSI.

It should be noted, in order to be able to perform client authentication for initial attachment to the VNO's network, the M2ME 110 needs to support an authentication algorithm, such as the Milenage algorithm, which is shared by all the M2MEs and the VNO 115.

The VNO 115, recognizing the PCID as an ID for the M2ME 110, contacts the ICF 160 that will accept the PCID as a legitimate preliminary credential, at 702. Then, the ICF 160 issues a set of preliminary authentication vectors (AV) to protect further communication with the M2ME 110, and starts to provide protected IP connectivity to the M2ME 110, at 703. This communication is performed using the air interface provided by the VNO's network.

Next, the M2ME 110 and the ICF 160 perform the standard AKA process to produce preliminary AKA keys to protect the communication from/to the M2ME 110, at 704. Afterwards and until the M2ME 110 connects to the network using the SHO's MID credentials after downloading and provisioning them, all communication between the M2ME 110 to the various network entities is done via the air interface provided by the VNO's network and the IP connectivity and encryption protection provided by the ICF 160.

The ICF 160 then redirects the M2ME 110 to the DPF 180. In doing so, the ICF 160 may send the PCID to the DRF 170, at 705. Then the DRF 170 aids the M2ME 110 to find the SHO 140, at 706. Next, the DRF 170 connects to the SHO 140 and registers the M2ME 110 for connection to the SHO's network, at 707. In response, the SHO 140 requests the PVA 150 to validate the authenticity and integrity of the TRE 230 of the M2ME 110, at 708. Then the PVA 150 validates the authenticity and integrity of the TRE 230 of the M2ME 110, at 709. The validation procedure may be performed in a manner similar to the validation procedures described above with respect to FIGS. 3-5.

Upon completing a validation, the PVA 150 sends the validation results back to the SHO 140, at 710. The SHO 140 contacts the DPF 180 and authorizes provisioning of the MID (USIM/ISIM application) to the M2ME 110, at 711.

Next, the DPF 180 downloads a MID object to the M2ME 110, at 712. Then the M2ME 110 provisions the downloaded MID into the TRE 230 and reports the success/failure status of the provisioning to the DPF 180, at 713. The M2ME 110 may need to send a token that can be used for verification of such a message. Such a token would need to be in a form that is resistant to tampering and replay attacks. Finally, the DPF 150 reports the success/failure status of the provisioning back to the SHO 140, at 714.

Figure 8:
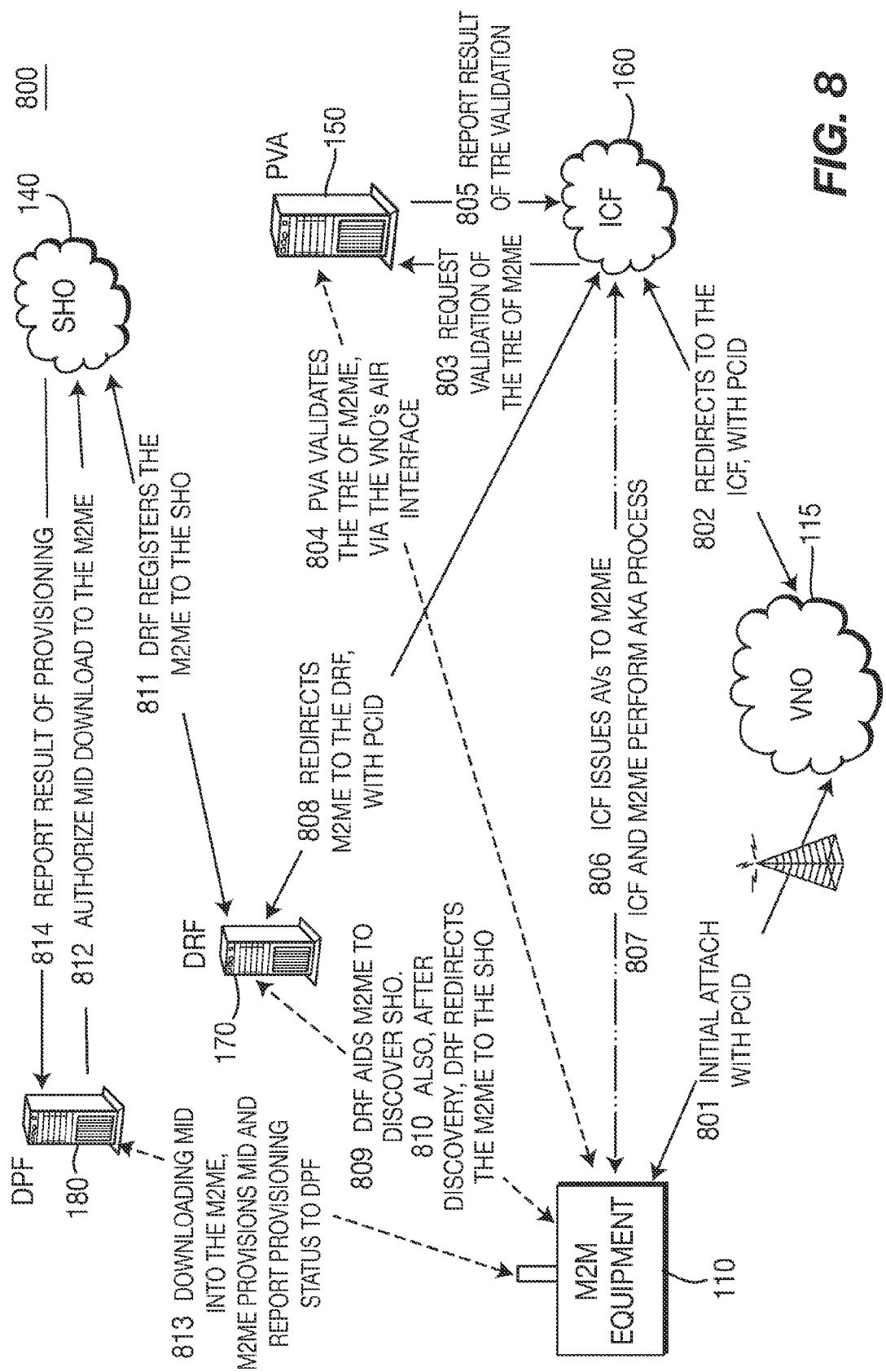
FIG. 8 shows an alternative example procedure for provisioning or re-provisioning of an M2ME.

FIG. 8 shows another procedure 800 for provisioning and re-provisioning of a MID to the M2ME 110 in case of authenticated access. In this procedure 800, the downloading and provisioning of MID to the M2ME 110 may occur when the M2ME 110 accesses a 3G VNO's network in its initial network access. The ICF 160 requests a PVA 150 to validate the TRE 230 of the M2ME 110 before releasing provisional authentication vectors to the M2ME 110 and also before allowing an IP connectivity to the M2ME 110 instead of having the TRE 230 validation take place prior to the SHO 140 authorizing the downloading and provisioning of its MID.

The procedure 800 begins when the M2ME 110 uses, for example, the standard GSM/UMTS principle (GPRS/PS) to decode network information and attach to the network of the VNO 115, at 801. In the attach message the M2ME 110 sends a PCID to the VNO 115. The M2ME 110 is authenticated by the standard UMTS AKA procedure by the VNO 115.

The VNO 115, recognizing the PCID for an M2ME 110, contacts an ICF 160 that will accept the PCID as a legitimate preliminary credential, at 802. Next, the ICF 160 requests the PVA 150 to validate the authenticity and integrity of the TRE 230 of the M2ME 110, at 803. Then the PVA 150 validates the authenticity and integrity of the TRE 230 of the M2ME 110, at 804. The validation may be performed using one of the previously mentioned validation procedures.

Once the PVA 150 sends the validation results back to the ICF 160, at 805, the ICF issues a set of preliminary authentication vectors (AV) to protect further communication with the M2ME 110, and starts to provide protected IP connectivity to the M2ME 110, at 806. This communication is done via the air interface provided by the VNO's network.

Next, the M2ME 110 and the ICF 160 perform the standard AKA process to produce preliminary AKA keys to protect the communication from/to the M2ME 110, at 807. Afterwards and until the M2ME 110 connects to the network using SHO's U(I)SIM credentials after downloading and provisioning them, all communication between the M2ME 110 to the various network entities is done via the air interface provided by the VNO's network and the IP connectivity and encryption protection provided by the ICF 160.

Then the ICF 160 directs the M2ME 110 to a DRF 170, at 808. In doing so, the ICF 160 sends the PCID as well as information about the TRE validation status to the DRF 170. The DRF 170 aids the M2ME 110 to find its SHO 140 and redirects the M2ME 110 to the SHO 140, at 809. The DRF 170 then connects to the SHO 140 and registers the M2ME 110 for connection to the SHO 140, at 810. In doing so, the DRF 170 also conveys to the SHO 140 information about the TRE validation status.

After reviewing the TRE validation status information it received from the DRF 170, the SHO 140 contacts the DPF 180 and authorize provisioning of the MID (USIM/ISIM application) into the M2ME 110, at 811. In response, the DPF 180 downloads a MID (U(I)SIM application and credentials) object to the M2ME 110, at 812.

The M2ME 110 provisions the downloaded MID into the TRE 230 and reports the success/failure status of the provisioning to the DPF 180, at 813. The M2ME 110 may send a token that can be used for verification of such message. Such a token should be in a form that is resistant to tampering and replay attacks. Finally, the DPF 180 reports the success/failure status of the provisioning back to the SHO 140.

Figure 9:
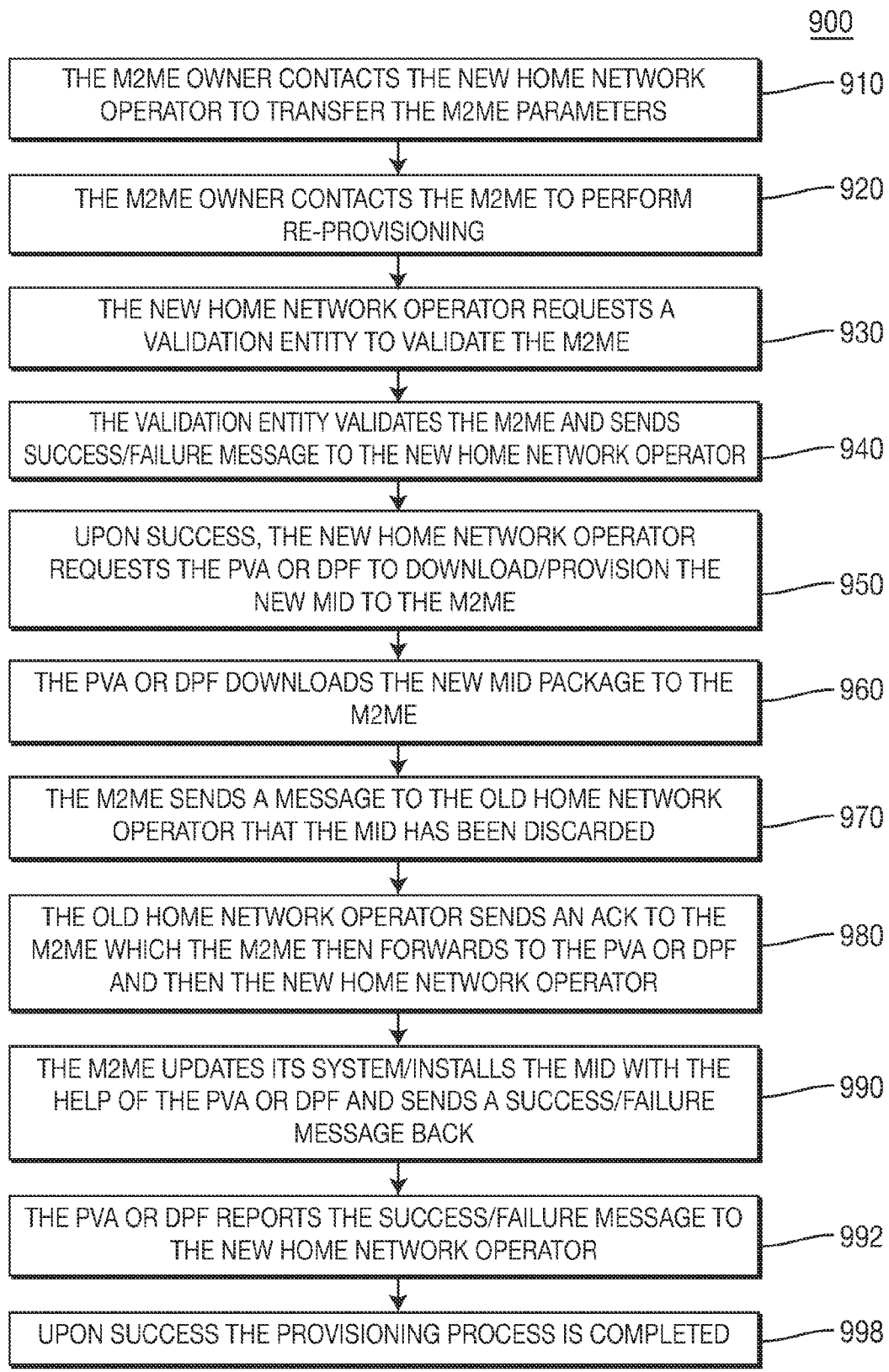
FIG. 9 shows an example flow diagram of a procedure for reprovisioning an M2ME for use with a new selected home operator.

FIG. 9 is an example flow diagram of a procedure 900 for reprovisioning the M2ME 110 for a new SHO (not shown). The procedure 900 begins when the M2ME owner contacts the New SHO to transfer the M2ME parameters, at 910. Then the M2ME Owner contacts the M2ME to initiate a re-provisioning prcedure, at 920.

The New SHO requests a validation entity to validate the M2ME 110, at 930. The PVA 150 then validates the M2ME 110 and sends success/failure message to the New SHO, at 940. Upon recieving notice of a success, the New SHO requests a DPF to download/provision the New MID (ie. USIM application and credentials) to the M2ME 110, at 950.

Then the DPF 180 securely downloads the New MID package to the M2ME 110, at 960. The M2ME 110 sends a message to the Old SHO that the Old MID has been discarded, at 970. Then, the Old SHO sends an ACK to the M2ME 110 which the M2ME 110 then forwards to the DPF 180 and then the New SHO, at 980

The M2ME 110 updates its system and installs the MID with the help of the DPF 180 and sends a success/failure message back to the DPF 180, at 990. The DPF 180 reports the success/failure message to the New SHO, at 992. Upon success the provisioning process is completed, at 998.

In another reprovisioning procedure, the M2ME 110 may be put in a pristine state and re-initiate the same type of process as the initial provisioning procedures described in FIGS. 7 and 8.

In another embodiment, the PVA 150 is responsible for ensuring that any software (SW) or firmware (FW) update performed while the M2ME 110 is still subscribed to the same SHO 140, will be done in a secure manner. This includes updating or re-configuring credentials.

This means that the PVA 150 or DPF 180 should supervise procedures such as secure over-the-air (and also on-wire) downloading of SW/FW and re-provisioning of the M2ME 110 and/or the TRE 230. Therefore, the PVA 150 or DPF 180 may employ such available methods as the ones provided in the OMA DM and OMA FOTA specifications, for secure downloading, FLASH update, and/or device reconfiguration of the M2ME 110.

Additionally, because the M2ME's trust state information can changed due to a remote SW/FW update or reconfiguration, PVA 150 or DPF 180 should be able to initiate and obtain the results of either a new verifiable boot or a run-time trust-state information check of the M2ME 110 or the TRE 230 upon completion of the SW/FW update or reconfiguration. The PVA 150 or DPF 180, should also update its own database of the trust state information about the M2ME 110. In case the DPF 180 is responsible for the remote SW/FW update or remote credentials reconfiguration, any predicted effect of the update/reconfiguration on the 'trust state' information about the M2ME 110 must be sent from the DPF 180 to the PVA 150, so that the PVA 150 can update its database of the 'trust state' information for the M2ME 110.

Additionally, solutions for detection of and post-detection remedial reaction against tampering of the M2ME 110 are disclosed. In order to make the M2ME 110 less vulnerable to tampering attack, several solutions are proposed.

First, the M2ME 110 may be configured to have functionality whereby it can detect certain types of 'tampering' done to it or any sub-system(s) within it on a sufficiently frequent (in case of regularly scheduled detection attempts) and/or timely (in case of event-driven detection attempts) basis. Examples of such detectable tamper events may include but are not limited to: (1) remediable and/or un-remediable compromise of the OS by malware or viruses; (2) buffer overflow events; (3) sudden unexpected or unauthorized changes in radio or higher-layer connectivity characteristics and/or environmental readings; (3) excessively repeated failure and/or denial of access or service by trusted network elements for the M2ME's requests for preliminary authentication, registration, or MID provisioning; or (4) any unexpected/unauthorized change in a post-boot or run-time reading of 'trust state' of the M2ME 110 or M2ME subsystem relating to remote MID management functionality. Network Elements such as the PVA 150, ICF 160, or any other network elements described in FIG. 1 may also be configured to detect tampering. For example, the network elements may be configured to remotely detect, using its own functions and/or functions of the M2ME 110 certain types of 'tampering' done to the M2ME 110. Additionally, the network elements may be configured to request the M2ME 110 to report on any tamper-detection event.

Upon self-detection of any tampering on itself, the M2ME 110 should take steps to limit further damage to it or other network elements. For example, upon detection of tampering, the M2ME 110 may be configured to disable functions related to remote MID management. The M2ME 110 may also be configured to disable access by internal resources (such as SW or certain parts of the OS) of the M2ME 110 to pre-designated highly sensitive areas of the M2ME 110 such as the TRE 230, or other portions of the M2ME 110 that hold remote-MID-management related data, code, or credentials, such as the SIM and/or TPM/MTM.

Upon self-detection of tampering, the M2ME 110 may also be configured to send to a designated network element (such as a PVA) a report of the suspected or detected tamper event as well as the event of the post-detection self-remedial or re-active action the M2ME 110 took. It should be noted that such an event report may also include a timestamp of the events or even a location-information stamp of the events such as the most current GPS reading of the M2ME 110 or a list of the neighboring cells.

Also upon detection of tampering, the M2ME 110 may be configured to perform remedial actions such as deleting, quarantining, or un-installing recent SW updates, or suspected viruses or malware codes or data. The M2ME 110, may also be configured to delete any pre-designated set of data related to remote MID management functions, such as USIM related keys or credentials, from transient (e.g. RAM) and/or persistent (e.g. NVRAM, Flash, Hard Disk, SIM, TPM/MTM internal or encrypted storage areas, etc) storage.

Finally, upon detection of tampering, the M2ME 110 may also be configured to power down the M2ME 110 or the part/subsystem of the terminal handling the remote MID management functionality.

Certain network elements such as the PVA 150 may also be responsible for and capable of initiating and performing remote 'post-detection' reactive actions on behalf of the M2ME 110 that (1) has either reported a suspected or detected tampering event, or (2) is suspected, by the PVA 150 itself or other network elements that interacted with it, to have experienced a tampering event.

The features and embodiments described above are applicable to other authentication protocols than those needed for authentication for 3G UMTS network access. Examples of such protocols may include, but are not limited to, those complying to the generic bootstrapping architecture (GBA) which is used for application-layer authentication, and the extensible authentication protocol based on SIM (EAP-SIM) for authentication of GSM/UMTS terminals to non-3G access networks. For example, the network elements described in FIG. 1 may exist and perform similar or same functions so as to allow authentication and remote management of the identity and authentication of M2ME devices for services, applications, or (non-3G) network accesses.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

Embodiments

1. A method for performing Machine-to-Machine (M2M) communication.

2. A method as in any one of the preceding embodiments, wherein communication includes one or more of authenticating, provisioning, or re-provisioning.

3. A method as in any one of the preceding embodiments, further comprising:
connecting, at a M2M-enabled equipment (M2ME), to a visited network operator's (VNO's) network.

4. A method as in any one of the preceding embodiments, further comprising:
receiving authorization to connect to a selected home operator's (SHO's) network.

5. A method as in any one of the preceding embodiments, further comprising:
connecting to the SHO's network.

6. A method as in any one of the preceding embodiments, wherein the VNO is a single network entity.

7. A method as in any one of the preceding embodiments, wherein the VNO includes a plurality of network entities.

8. A method as in any one of the preceding embodiments, wherein the VNO is any access network that is accessed for the purpose of initial registration and provisioning.

9. A method as in any one of the preceding embodiments, wherein registration and provisioning includes registration and provisioning of USIM/ISIM applications.

10. A method as in any one of the preceding embodiments, further comprising:
the M2ME registering with a SHO that is not the VNO; and
the VNO remaining a VNO.

11. A method as in any one of the preceding embodiments, further comprising:
The M2ME registering with a SHO that is the VNO; and
The VNO becoming a SHO.

12. A method as in any one of the preceding embodiments, wherein the VNO is responsible for providing temporary network access to the M2ME.

13. A method as in any one of the preceding embodiments, where temporary network access is based on temporary network access credentials.

14. A method as in any one of the preceding embodiments, wherein temporary network access credentials include a PCID or any other temporary private ID.

15. A method as in any one of the preceding embodiments, further comprising:
the VNO providing open network access to the discovery and registration function (DRF).

16. A method as in any one of the preceding embodiments, wherein no credentials or authentication are required for access to the services of at least the DRF.

17. A method as in any one of the preceding embodiments, wherein the VNO provides open network access to the DRF when the VNO will become the SHO.

18. A method as in any one of the preceding embodiments, further comprising:
the VNO providing full network access using provisioned USIM/ISM applications.

19. A method as in any one of the preceding embodiments, wherein full network access includes IMS.

20. A method as in any one of the preceding embodiments, wherein a RO includes one or more of an ICF, a DRF, and a downloading and provisioning function (DPF).

21. A method as in any one of the preceding embodiments, wherein the ICF, the DRF, and the DPF are each located in a separate entity.

22. A method as in any one of the preceding embodiments, wherein the ICF is responsible for the validation of credentials that allow temporary access to communication networks for the purpose of registration and provisioning of operational network access.

23. A method as in any one of the preceding embodiments, further comprising:
the ICF issuing temporary network access credentials.

24. A method as in any one of the preceding embodiments, further comprising:
the ICF issuing a temporary private identifier for the M2ME.

25. A method as in any one of the preceding embodiments, wherein temporary network access credentials or a temporary private identifier are used for authenticated initial temporary network access.

26. A method as in any one of the preceding embodiments, further comprising:
The ICF provisioning the M2ME with one or more of M2M keys, configurations, and applications.

27. A method as in any one of the preceding embodiments, wherein provisioning includes over the air provisioning.

28. A method as in any one of the preceding embodiments, further comprising:
the ICF providing credentials to the equipment supplier (E/S) to pre-configure the M2ME.

29. A method as in any one of the preceding embodiments, wherein the ICF is configured to provide secure transmission of credentials to the organization that is responsible for embedding them intot the M2ME.

30. A method as in any one of the preceding embodiments, further comprising:
the ICF registering credentials in a database.

31. A method as in any one of the preceding embodiments, further comprising:
the ICF receiving a request to validate credentials from a third party; and
the ICF performing credentials validation.

32. A method as in any one of the preceding embodiments, wherein credentials validation includes secure transmission of authentication vectors to a third party.

33. A method as in any one of the preceding embodiments, wherein authentication vectors includes related data.

34. A method as in any one of the preceding embodiments, wherein all access networks are considered visited networks prior to successful registration of the M2ME to the SHO.

35. A method as in any one of the preceding embodiments, wherein the M2ME connects to the SHO transparently through a conventional network without network changes.

36. A method as in any one of the preceding embodiments, wherein the DRF enables the after-purchase selection of a specific SHO, and registration of the M2ME with the selected SHO.

37. A method as in any one of the preceding embodiments, wherein the DRF is an independent service.

38. A method as in any one of the preceding embodiments, wherein the DRF is operated by a SHO.

39. A method as in any one of the preceding embodiments, wherein the SHO's RO may be contacted via the SHO's 3GPP network.

40. A method as in any one of the preceding embodiments, wherein the SHO's RO may be contacted via the Internet.

41. A method as in any one of the preceding embodiments, wherein the SHO's RO is discoverable.

42. A method as in any one of the preceding embodiments, wherein the SHO's RO is discoverable using functionality in the M2ME.

43. A method as in any one of the preceding embodiments, wherein the DRF allows the customer to select the SHO after delivery of the M2ME.

44. A method as in any one of the preceding embodiments, wherein the DRF allows the M2ME to have an IP connection to the RO using either temporary authenticated network access or limited open network access.

45. A method as in any one of the preceding embodiments, wherein the DRF allows the M2ME to request USIM/ISM application provisioning via a VNO.

46. A method as in any one of the preceding embodiments, further comprising:
the DRF approving a provisioning request; and
authorizing a DPF to provision the M2ME.

47. A method as in any one of the preceding embodiments, wherein the DRF supports registration of the M2ME by the owner of the M2ME.

48. A method as in any one of the preceding embodiments, wherein the DRF supports association of the M2ME with a SHO.

49. A method as in any one of the preceding embodiments, further comprising:
validating, via the PVA, the authenticity of the TRE using the M2ME's credentials.

50. A method as in any one of the preceding embodiments, further comprising:
the DRF generating a package of data to be transmitted to the M2ME.

51. A method as in any one of the preceding embodiments, further comprising:
the DRF obtaining a package of data to be transmitted to the M2ME.

52. A method as in any one of the preceding embodiments, further comprising:
the DRF transmitting data securely to the PS.

53. A method as in any one of the preceding embodiments, further comprising:
the DPF generating a package of data to be transmitted to the M2ME.

54. A method as in any one of the preceding embodiments, further comprising:
the DPF obtaining a package of data to be transmitted to the M2ME.

55. A method as in any one of the preceding embodiments, further comprising:
the DPF transmitting data securely to the PS.

56. A method as in any one of the preceding embodiments, further comprising:
the DRF facilitating the setting up of a security association between the M2ME and the DPF.

57. A method as in any one of the preceding embodiments, further comprising:
the DRF generating and transmitting security tokens to the M2ME and the DPF over secure channels.

58. A method as in any one of the preceding embodiments, wherein the DPF enables the remote provisioning of USIM/ISM credentials to the M2ME.

59. A method as in any one of the preceding embodiments, further comprising:
The DPF receiving authorization from the DRF to provision the M2ME.

60. A method as in any one of the preceding embodiments, wherein receiving authorization includes the DPF receiving a security token for communicating with the M2ME.

61. A method as in any one of the preceding embodiments, further comprising:
the DPF receiving an application package from the DRF.

62. A method as in any one of the preceding embodiments, further comprising:
the DPF generating an application package from stored rules; and
advising the DRF of credentials that have been downloaded to the DRF.

63. A method as in any one of the preceding embodiments, wherein the DPF is configured to support the provisioning of a USIM/ISM application or USMI/ISIM parameters to the M2ME.

64. A method as in any one of the preceding embodiments, wherein the DPF is configured to perform future updates to a USIM/ISIM application or USIM/ISIM parameters to the M2ME.

65. A method as in any one of the preceding embodiments, wherein the DPF is configured to perform future provisioning of new applications.

66. A method as in any one of the preceding embodiments, wherein the DPF is configured to notify the DRF of a successful or unsuccessful provisioning event.

67. A method as in any one of the preceding embodiments, wherein the SHO is the network operator which has a commercial relationship with the user of the M2ME.

68. A method as in any one of the preceding embodiments, wherein the SHO is responsible for billing the customer.

69. A method as in any one of the preceding embodiments, wherein the SHO performs the role of the DRF.

70. A method as in any one of the preceding embodiments, wherein the SHO performs the role of the DPF.

71. A method as in any one of the preceding embodiments, wherein the SHO performs other roles.

72. A method as in any one of the preceding embodiments, wherein the SHO has an operational relationship with the DRF and DPF.

73. A method as in any one of the preceding embodiments, wherein the DRF and the DPF have an operation relationship with each other.

74. A method as in any one of the preceding embodiments, wherein the M2ME is initially not commissioned to operate with a service provider.

75. A method as in any one of the preceding embodiments, wherein the M2ME, in communication with the VNO, establishes a channel to the RO.

76. A method as in any one of the preceding embodiments, wherein a M2ME has a private identity.

77. A method as in any one of the preceding embodiments, wherein a PCID is a private identity.

78. A method as in any one of the preceding embodiments, wherein a private identity enables any VNO to recognize the M2ME, to permit temporary access to the VNO's services, and to direct the initial connectivity messages to the appropriate network components in order to download and provision service with an operator.

79. A method as in any one of the preceding embodiments, wherein the PVA is responsible for credentials that attest to the authenticity of the secure device within the M2ME that is used for storage and execution of downloaded USIM/ISIM applications.

80. A method as in any one of the preceding embodiments, wherein the PVA includes one or more commercial organizations who issue credentials and provide credential validation services.

81. A method as in any one of the preceding embodiments, wherein credentials include certificates and key pairs.

82. A method as in any one of the preceding embodiments, wherein the secure device within the M2ME is one or more of a UICC, a TRE, or some other secure module.

83. A method as in any one of the preceding embodiments, wherein the PVA function is required where strong authentication of the secure device is a prerequisite for the provisioning of the USIM/ISIM applications.

84. A method as in any one of the preceding embodiments, further comprising:
creating and issuing credentials to attest to the security of a secure device within the M2ME.

85. A method as in any one of the preceding embodiments, wherein the creating and issuing of credentials to attest to the security of a secure device within the M2ME are performed by the PVA.

86. A method as in any one of the preceding embodiments, wherein the PVA is configured to provide validation the credentials for the secure device within the M2ME.

87. A method as in any one of the preceding embodiments, wherein the PVA is configured to provide for maintenance of data relating to the validity of issued credentials.

88. A method as in any one of the preceding embodiments, wherein the equipment supplier (E/S) securely obtains credentials from the ICF for authentication of for temporary initial network access.

89. A method as in any one of the preceding embodiments, wherein the E/S is configured to support re-configuration of the M2ME.

90. A method as in any one of the preceding embodiments, wherein re-configuration includes provisioning the M2ME with preliminary network-access credentials.

91. A method as in any one of the preceding embodiments, wherein the E/S is configured to obtain securely from a PVA 150 the credentials for use in proving to the DRF 170, via the ICF 160, that the M2ME complies with a standardized set of security requirements.

92. A method as in any one of the preceding embodiments, wherein the E/S is configured to configure the M2ME with credentials.

93. A method as in any one of the preceding embodiments, wherein the E/S is configured to provide a means for the M2ME owner to select a desired DRF and SHO.

94. A method as in any one of the preceding embodiments, wherein the E/S is configured to provide for automatic DRF and SHO selection to occur when the M2ME is connected to an access network.

95. A method as in any one of the preceding embodiments, wherein an M2ME includes one or more of a transmitter, a receiver, a processor, a trusted environment (TRE), a global positioning system (GPS), a subscriber identity module (SIM), and a secure time unit.

96. A method as in any one of the preceding embodiments, wherein the M2ME is configured to support many different trust mechanisms.

97. A method as in any one of the preceding embodiments, wherein the M2ME is configured to support one or more of TRE, SIM, or ISIM.

98. A method as in any one of the preceding embodiments, wherein trust mechanisms are fully integrated into common AKA protocols.

99. A method as in any one of the preceding embodiments, wherein common AKA protocols include one or more of trust state information, or keys protected byt the TRE.

100. A method as in any one of the preceding embodiments, wherein AKA protocols protect any communication between the M2ME and a network element before full AKA can take place and after authentication has been established.

101. A method as in any one of the preceding embodiments, wherein the SIM is enhanced to include the functions of a trusted processing module (TPM) or mobile trusted module (MTM).

102. A method as in any one of the preceding embodiments, wherein the SIM is configured to operate closely with a TPM or MTM.

103. A method as in any one of the preceding embodiments, wherein the TRE is configured to perform the functionality of the SIM.

104. A method as in any one of the preceding embodiments, wherein the M2ME is provisioned with an AKA root secret.

105. A method as in any one of the preceding embodiments, whereint he root secret is provisioned by the E/S.

106. A method as in any one of the preceding embodiments, wherein the root secret is protected by the USIM.

107. A method as in any one of the preceding embodiments, wherein the root secret never changes.

108. A method as in any one of the preceding embodiments, wherein the processor is configured to derive session keys from the AKA root secret.

109. A method as in any one of the preceding embodiments, wherein the M2ME is configured to provide trust state information to the ICF.

110. A method as in any one of the preceding embodiments, wherein the trust state information may be used for preliminary authentication when the M2ME attaches to the VNO.

111. A method as in any one of the preceding embodiments, wherein trust state information is used to derive session keys.

112. A method as in any one of the preceding embodiments, wherein n refers to the index for the most current update of the session keys $CK_n$ and $IK_n$ and $CKn=f3K (RAND\|PCR0n)$, $IKn=f4K (RAND\|PCR0\ n)$ where $f3_K()$ and $f4_K()$ refer to the AKA key derivation functions for the cipher key and integrity key, respectively, out of the shared master secret K, RAND is the random nonce within the Authentication Vector (AV) generated by the CATNA and sent to, and thus shared by, the M2ME 110 in the AKA process, and $PCR0_n$ refers to the most current value of the PCR0 register inside an MTME on the M2ME 110.

113. A method as in any one of the preceding embodiments, wherein the current value of PCR0 register signifies a description of the most recent post-boot trust status of the M2ME.

114. A method as in any one of the preceding embodiments, wherein the values of $CK_n$ and $IK_n$ change when the value of PCR0 changes between boots.

115. A method as in any one of the preceding embodiments, wherein the ICF is aware of changes to the trust state of the M2ME.

116. A method as in any one of the preceding embodiments, wherein changes to the trust state of the M2ME include changes to the value of PCR0.

117. A method as in any one of the preceding embodiments, wherein the ICF is notified of the schedule and substance of updates to the M2ME's OS, firmware, or applications.

118. A method as in any one of the preceding embodiments, wherein the ICF is notified of any change to the M2ME that affects the trust state of the M2ME.

119. A method as in any one of the preceding embodiments, wherein AKA ciphering and integrity keys shared between the M2ME and the ICF are updated and made useful for authentication of the M2ME.

120. A method as in any one of the preceding embodiments, wherein the session keys reflect the most current trust state value of the M2ME.

121. A method as in any one of the preceding embodiments, wherein the session keys enhance security of the AKA key derivation process.

122. A method as in any one of the preceding embodiments, wherein the TRE is a logically separate area in the M2ME.

123. A method as in any one of the preceding embodiments, wherein there is hardware support for the logical separation of the TRE.

124. A method as in any one of the preceding embodiments, wherein the TRE is a removable module.

125. A method as in any one of the preceding embodiments, wherein the TRE is a non-removable module.

126. A method as in any one of the preceding embodiments, wherein the TRE functions with an integrated circuit (IC).

127. A method as in any one of the preceding embodiments, wherein the TRE functions are distributed across a plurality of ICs.

128. A method as in any one of the preceding embodiments, wherein the TRE defines logical and physical interfaces to the outside world.

129. A method as in any one of the preceding embodiments, wherein the interfaces exposed by the TRE are usable under the control of an authorized entity.

130. A method as in any one of the preceding embodiments, wherein the TRE provides a root of trust for the secure storage and secure execution environment for multiple management identities (MIDs).

131. A method as in any one of the preceding embodiments, wherein the TRE provides for provisioning and managing MIDs.

132. A method as in any one of the preceding embodiments, wherein a MID is a secure application.

133. A method as in any one of the preceding embodiments, wherein a MID includes one or more of a subscription management function, a secure payment application, a subscription management identity, a USIM application, an ISIM application, a virtual SIM (vSIM), or a dynamic security identity solution.

134. A method as in any one of the preceding embodiments, wherein the TRE is provisioned in a secure, out-of-band facility with any required cryptographic keys and other credentials.

135. A method as in any one of the preceding embodiments, wherein the TRE provides protection against physical and logical attacks.

136. A method as in any one of the preceding embodiments, wherein the TRE enforces its own secirty policy.

137. A method as in any one of the preceding embodiments, wherein the TRE is sufficiently secure to allow the storage and execution of MIDs.

138. A method as in any one of the preceding embodiments, wherein the TRE has interfaces to parts of the M2ME that are outside the TRE.

139. A method as in any one of the preceding embodiments, wherein the TRE has an embedded unique identiy.

140. A method as in any one of the preceding embodiments, wherein the identity of the TRE is associated with the identity of the M2ME.

141. A method as in any one of the preceding embodiments, wherein the TRE is configured to securely authenticate its identity to issuing authorities using standard protocols.

142. A method as in any one of the preceding embodiments, wherein the TRE is implemented in an UICC.

143. A method as in any one of the preceding embodiments, wherein the TRE is implemented as an integrated solution on the M2ME using hardware and software components provided by the M2ME.

144. A method as in any one of the preceding embodiments, wherein the TRE supports downloading and remote provisioning and management of MIDs.

145. A method as in any one of the preceding embodiments, wherein the TRE supports the functionally of the management identity executable (MIDE).

146. A method as in any one of the preceding embodiments, wherein the M2ME supports integrity checks of the software code and data that make up the TRE code base.

147. A method as in any one of the preceding embodiments, wherein the TRE is checked at power up/boot-time of the M2ME.

148. A method as in any one of the preceding embodiments, wherein code checks are conducted during operation use of the M2ME.

149. A method as in any one of the preceding embodiments, wherein code checks are performed as a background process at defined intervals or at certain triggers.

150. A method as in any one of the preceding embodiments, wherein the code checks cover a partial or full check of the M2ME.

151. A method as in any one of the preceding embodiments, wherein the TRE includes support for multiple isolated, trusted domains.

152. A method as in any one of the preceding embodiments, wherein each domain is owned by a stakeholder-owner.

153. A method as in any one of the preceding embodiments, wherein each domain is isolated from other domains.

154. A method as in any one of the preceding embodiments, wherein each domain is protected against tampering and unauthorized access.

155. A method as in any one of the preceding embodiments, wherein the TRE provides inter domain services.

156. A method as in any one of the preceding embodiments, wherein inter-domain services include one or more of authentication and attestation functionality.

157. A method as in any one of the preceding embodiments, wherein the M2ME connects to a network sporadically or infrequently.

158. A method as in any one of the preceding embodiments, wherein the M2ME operates in a dormant state.

159. A method as in any one of the preceding embodiments, wherein run-time integrity checks of the TRE's software code are configured to take place while the M2ME operates in a dormant state.

160. A method as in any one of the preceding embodiments, wherein integrity checks do not interfere with other M2ME or TRE processes.

161. A method as in any one of the preceding embodiments, wherein the status of integrity checks is ready when the M2ME connects to the SHO.

162. A method as in any one of the preceding embodiments, wherein the M2ME is assigned a temporary private identity that is unique to the M2ME.

163. A method as in any one of the preceding embodiments, wherein a PCID is valid for a time limited validity period.

164. A method as in any one of the preceding embodiments, wherein the validity period is enforced by the M2ME.

165. A method as in any one of the preceding embodiments, wherein the validity period is controlled by the TRE.

166. A method as in any one of the preceding embodiments, further comprising:
removing the PCID.

167. A method as in any one of the preceding embodiments, wherein a PCID may be used by more than one M2ME, but not at the same time.

168. A method as in any one of the preceding embodiments, wherein PCIDs are systematically reallocated.

169. A method as in any one of the preceding embodiments, wherein a plurality of PCIDs are provisioned to an M2ME.

170. A method as in any one of the preceding embodiments, wherein M2MEs are released in groups of size N.

171. A method as in any one of the preceding embodiments, wherein M2MEs of the jth batch are referred to as $M\_i,j$ where $j=1, \ldots, M$.

172. A method as in any one of the preceding embodiments, wherein PCID assignment may be initialized with a matrix $(P)\_\{i,j\}$ of size N×M.

173. A method as in any one of the preceding embodiments, wherein the M2ME $M\_i,1$ gets column $P\_i,*$ loaded into the TRE during manufacture.

174. A method as in any one of the preceding embodiments, wherein a swcure timer or monotonic counter is initialized, activated, and put under control of the TRE.

175. A method as in any one of the preceding embodiments, wherein the M2ME $M\_i,1$, uses $P\_i,1$ for a determined time span T or a predetermined number of times based on the time or counter that was initialized.

176. A method as in any one of the preceding embodiments, wherein the TRE discards $P\_i,1$ and uses $P\_i,2$.

177. A method as in any one of the preceding embodiments, wherein the network is configured to determine where a device is in a lifetime cycle.

178. A method as in any one of the preceding embodiments, wherein handling the PCID column vector with the TRE and enforcement of time limits by the TRE prevents concurrent use of PCIDs and ensures that the M2ME has a valid PCID throughout its operation time.

179. A method as in any one of the preceding embodiments, wherein the M2ME is configured to re-provision PCIDs.

180. A method as in any one of the preceding embodiments, wherein at least two M2MEs try to use the same PCID at the same time.

181. A method as in any one of the preceding embodiments, wherein the number of PCIDs is much larger than the number of M2MEs in a batch.

182. A method as in any one of the preceding embodiments, wherein a PCID is chosen randomly.

183. A method as in any one of the preceding embodiments, wherein the clocks of a plurality of M2MEs are synchronized.

184. A method as in any one of the preceding embodiments, wherein the M2ME's clock is re-synchronized with a plurality of M2MEs.

185. A method as in any one of the preceding embodiments, wherein the TRE is configured to hold and manage a time base.

186. A method as in any one of the preceding embodiments, wherein the TRE is configured to support synchronization with a trusted time source.

187. A method as in any one of the preceding embodiments, wherein the TRE relies on a trusted time unit located in the M2ME.

188. A method as in any one of the preceding embodiments, wherein the M2ME includes autonomous geo-position equipment.

189. A method as in any one of the preceding embodiments, wherein the TRE has secure access to the geo-positioning equipment.

190. A method as in any one of the preceding embodiments, wherein no two M2MEs physically establish a radio connection to the same access network cell at the same time.

191. A method as in any one of the preceding embodiments, wherein the M2ME is provisioned with a destination geo-position (D), and a tolerance range (R).

192. A method as in any one of the preceding embodiments, wherein the values of D and R are stored in the TRE.

193. A method as in any one of the preceding embodiments, wherein the values of D and R are cryptographically secured so that only the TRE can access the data.

194. A method as in any one of the preceding embodiments, further comprising:
the TRE determining its current geo-position;
comparing the current geo-position to D within R; and
releasing the PCID for network access.

195. A method as in any one of the preceding embodiments, wherein the access network maintains records of PCID, cell ID pairs.

196. A method as in any one of the preceding embodiments, wherein access to the network by the M2ME is permitted at a predetermined plurality of cells.

197. A method as in any one of the preceding embodiments, wherein the M2ME is configured with a plurality of network cell identifiers.

198. A method as in any one of the preceding embodiments, wherein the M2ME is moved geographically.

199. A method as in any one of the preceding embodiments, wherein network access is disabled when the M2ME is moved.

200. A method as in any one of the preceding embodiments, wherein the M2ME is provisioned with a plurality of triples that designate the places where a PCID may be used.

201. A method as in any one of the preceding embodiments, wherein a triple includes a PCID, D, and R.

202. A method as in any one of the preceding embodiments, further comprising:
determining the current geo-position of the TRE;

comparing the current geo-position to the plurality of triples; and releasing the PCID associated with the current geo-position.

203. A method as in any one of the preceding embodiments, wherein the M2ME is provisioned with a plurality of quintuples.

204. A method as in any one of the preceding embodiments, wherein a quintuple includes a PCID, D, R, t1, and t2, where t1 designates a starting time, and t2 designates an ending time of the validity period.

205. A method as in any one of the preceding embodiments, wherein quintuples describe a path for M2ME.

206. A method as in any one of the preceding embodiments, wherein failure of an M2ME to connect to the network at a predetermined time triggers an alarm.

207. A method as in any one of the preceding embodiments, wherein quintuples may be reprovisioned.

208. A method as in any one of the preceding embodiments, wherein quintuples may be reprovisioned using a PCID update service (PUS).

209. A method as in any one of the preceding embodiments, wherein a PUS is configured to identify the TRE.

210. A method as in any one of the preceding embodiments, wherein the ICF includes the PUS.

211. A method as in any one of the preceding embodiments, wherein the PUS is a separate network component.

212. A method as in any one of the preceding embodiments, wherein quintuple reprovisioning includes changes to one or more quintuples.

213. A method as in any one of the preceding embodiments, wherein the TRE's identity is sent to a network server which can associate the TRE with a current network IP address.

214. A method as in any one of the preceding embodiments, wherein remote provisioning is delegate to a DPF.

215. A method as in any one of the preceding embodiments, further comprising:

the PUS connecting to the M2ME and TRE;

the PUS requesting a validation of the TRE;

the PUS delivering a new plurality of quintuples and a list of old quintuples to be discarded; and the TRE installing the new quintuples and discarding the old quintuples.

216. A method as in any one of the preceding embodiments, wherein the TRE is configured to produce pseudo-random numbers which can be adjoined with the PCID.

217. A method as in any one of the preceding embodiments, wherein the access network is configured to keep track of and distinguish between the pseudo-random numbers.

218. A method as in any one of the preceding embodiments, wherein communicating entities are the M2ME, the TRE, and a network access point (NAP).

219. A method as in any one of the preceding embodiments, wherein a NAP is an enodeB associated with the VNO.

220. A method as in any one of the preceding embodiments, wherein the TRE is configured to generate a random number (RAND) to be used in a single initial network connection.

221. A method as in any one of the preceding embodiments, further comprising:

the TRE applying an integrity protection method.

222. A method as in any one of the preceding embodiments, wherein the integrity protection method is a keyed has function where RAND enters a second parameter, additional data as needed (D1), and a PCID.

223. A method as in any one of the preceding embodiments, further comprising:

the TRE sends TRE→eNB: RAND∥PCID∥D1∥M1:=MAC (PCID∥D1, RAND) to the eNB;

the eNB verifies the message authentication code (MAC);

the eNB builds a return package out of the payload data D2, M1; and the eNB sends the return package to the TRE as eNB→TRE: D2∥M2:=MAC(PCID∥D2, M1.

224. A method as in any one of the preceding embodiments, wherein subsequent message exchanges include a MAC of a data element that includes any new message element and the immediately previous echange's MAC.

225. A method as in any one of the preceding embodiments, wherein the eNB and the TRE can distinguish message during communication using the last value $M_{n-1}$ to build the new $M_n$.

226. A method as in any one of the preceding embodiments, wherein man-in-the-middle attacks are avoided.

227. A method as in any one of the preceding embodiments, wherein a shared secret is included in messages for authentication of the communicating parties.

228. A method as in any one of the preceding embodiments, wherein a shared secret is a negotiated secret.

229. A method as in any one of the preceding embodiments, wherein the MAC values include the PCID.

230. A method as in any one of the preceding embodiments, wherein the eNB maintains a table representing the state of all concurrently active network access attempts (channels) using PCIDs.

231. A method as in any one of the preceding embodiments, wherein the first column in the table contains an index of the PICD belonging to the channel.

232. A method as in any one of the preceding embodiments, wherein the index points to an entry in a list of all PCIDs currently active for all channels.

233. A method as in any one of the preceding embodiments, wherein the index is the PCID value.

234. A method as in any one of the preceding embodiments, further comprising:

the eNB receiving a message on a channel TRE→eNB: D3∥M3:=MAC(PCID∥D3, M2).

235. A method as in any one of the preceding embodiments, further comprising:

the eNB selecting $PCID_i$ from PL for i-1 to N.

236. A method as in any one of the preceding embodiments, further comprising:

for all table rows with PCID index I in the first cell, the eNB calculating M:=MAC($PCID_i$∥$D_3$, $M_2$), wherein $M_2$ is taken from the second cell in the row.

237. A method as in any one of the preceding embodiments, further comprising:

success state is reached and the search procedure ends.

238. A method as in any one of the preceding embodiments, wherein the row number of the channel corresponding to the last receive third message is returned.

239. A method as in any one of the preceding embodiments, wherein $D_3$ is added to the data history and $M_2$ is replaced by $M_3$ in the active hash value cell of the selected table row.

240. A method as in any one of the preceding embodiments, wherein a message contains the index I of the channel to find the associated channel fo a subsequent message.

241. A method as in any one of the preceding embodiments, wherein the active PCIDs are locked.

242. A method as in any one of the preceding embodiments, wherein PCIDs are actively deallocated.

243. A method as in any one of the preceding embodiments, wherein the TRE discards a used PCID when it has been used for obtaining full network connectivity.

244. A method as in any one of the preceding embodiments, wherein a PCID is discarded after a validity period has expired.

245. A method as in any one of the preceding embodiments, wherein a PCID is discarded in response to a request.

246. A method as in any one of the preceding embodiments, wherein a discarded PCID is used by a different M2ME.

247. A method as in any one of the preceding embodiments, wherein a connection is established from the TRE to the E/S to signal the dellocation event.

248. A method as in any one of the preceding embodiments, wherein the E/S maintains a list of deallocated PCIDs.

249. A method as in any one of the preceding embodiments, wherein a PCID is not transferred in clear text during the deallocation process.

250. A method as in any one of the preceding embodiments, wherein validation is performed autonomously.

251. A method as in any one of the preceding embodiments, wherein validation is performed semi-autonomously.

252. A method as in any one of the preceding embodiments, wherein validation is performed remotely.

253. A method as in any one of the preceding embodiments, wherein autonomous validation is performed before the M2ME will allow itself to undergo network attachment.

254. A method as in any one of the preceding embodiments, wherein semi-autonomous validation includes assessing the validity of the M2ME without depending on external network entities.

255. A method as in any one of the preceding embodiments, wherein the result of a semi-autonomous validation is reported to a remote entity.

256. A method as in any one of the preceding embodiments, wherein the result includes evidence of the binding of authentication of the TRE to the M2ME.

257. A method as in any one of the preceding embodiments, wherein the remote entity is the PVA.

258. A method as in any one of the preceding embodiments, wherein the signaling between the M2ME and the remote entity is protected.

259. A method as in any one of the preceding embodiments, wherein remote validation includes an external network entity directly assessing the validity and integrity of the M2ME after receiving evidence for the validation generated by the TRE and evidence of binging between the TRE and the M2ME.

260. A method as in any one of the preceding embodiments, wherein the external network entity is the PVA.

261. A method as in any one of the preceding embodiments, wherein the communication between the M2ME and the external network entity is protected.

262. A method as in any one of the preceding embodiments, wherein autonomous validation is performed and no direct evidence of the validation is provided to the outside world.

263. A method as in any one of the preceding embodiments, wherein the M2ME fails validation and the TRE prevents it from attaching to a network or obtaining an authenticated connection to a remote entity.

264. A method as in any one of the preceding embodiments, further comprising:

the TRE checking if it has achieved a predefined state of secure start-up.

265. A method as in any one of the preceding embodiments, further comprising:

checking if a predefined portion of the rest of the M2ME that needs secure start-up has achieved a predefined state of secure start-up.

267. A method as in any one of the preceding embodiments, wherein further checks are performed byt the TRE.

268. A method as in any one of the preceding embodiments, wherein further checks are performed by a measuring component in the M2ME external to the TRE but integrity-protected by the TRE.

269. A method as in any one of the preceding embodiments, wherein the TRE permits the M2ME to engage in a requested authentication procedure.

270. A method as in any one of the preceding embodiments, wherein autonomous validation is the most economic method in terms of external communication required.

271. A method as in any one of the preceding embodiments, wherein autonomous validation does not permit any outside entity to independently assess the integrity of the TRE during network access or during a phase of uninterrupted connectivity.

272. A method as in any one of the preceding embodiments, wherein the TRE stores a log of the validation process and its results.

273. A method as in any one of the preceding embodiments, wherein the log constitutes an audit record.

274. A method as in any one of the preceding embodiments, wherein the audit data is stored in a secure internal archive.

275. A method as in any one of the preceding embodiments, wherein the secure internal archive is within the TRE.

276. A method as in any one of the preceding embodiments, wherein the secure internal archive is protected by the TRE.

277. A method as in any one of the preceding embodiments, wherein tampering with the secure internal archive is detected.

278. A method as in any one of the preceding embodiments, wherein integrity protection of the data is provided.

279. A method as in any one of the preceding embodiments, wherein audit data is boutd to the specific purpose for which autonomous validation is invoked.

280. A method as in any one of the preceding embodiments, wherein the data includes the purpose of the validation.

281. A method as in any one of the preceding embodiments, wherein shared secrets or credentials established in the access protocol are attached to the audit data and a digital signature is applied by the TRE to the produced data to protect its integrity.

282. A method as in any one of the preceding embodiments, wherein an entity independent of the M2ME requests the audit data periodically to establish whether the M2ME is trustworthy at every earlier network access event.

283. A method as in any one of the preceding embodiments, wherein the data is counter-checked with the network-side protocols about network access attempts to detect tampering.

284. A method as in any one of the preceding embodiments, wherein integrity of other components, configurations, or parameters of the rest of the M2ME is checked when they are loaded, started, or at any other, pre-defined, run-time time event that is available to the measuring component.

285. A method as in any one of the preceding embodiments, wherein the remote entity becomes indirectly aware that the M2ME has passed a semi-autonomous validation test.

286. A method as in any one of the preceding embodiments, wherein there is explicit signaling to the network of the outcome of a semi-autonomous validation.

287. A method as in any one of the preceding embodiments, wherein the signaling is protected cryptographically.

288. A method as in any one of the preceding embodiments, wherein the signaling precedes the M2ME authentication required for MID download.

289. A method as in any one of the preceding embodiments, wherein the signaling includes evidence of the binding between the TRE's authentication and the resources in the M2ME used for validity checking.

290. A method as in any one of the preceding embodiments, wherein evidence includes a token sent from the M2ME to the network that provides further information for establishing certification of the TRE and M2ME.

291. A method as in any one of the preceding embodiments, wherein the PVA or the SHO requests the TRE to perform validation periodically.

292. A method as in any one of the preceding embodiments, wherein the security gateway (SeGW) request validation.

293. A method as in any one of the preceding embodiments, wherein the request is sent after the M2ME is registered.

294. A method as in any one of the preceding embodiments, wherein the request is sent once the Home eNodeB (H(e)NB) is authentication for the very first time by the SeGW.

295. A method as in any one of the preceding embodiments, wherein the request is sent periodically as a protected operation and maintenance (OAM) message from one or more of the PVA, the SHO, the SeGW.

296. A method as in any one of the preceding embodiments, wherein the period of a periodic re-validation is relatively long, but short enough to make the SHO feel safe about the freshness of the validation.

297. A method as in any one of the preceding embodiments, wherein the TRE performs a validation procedure based on the request.

298. A method as in any one of the preceding embodiments, wherein the TRE generates a time-stamp indicating the last successful validation.

299. A method as in any one of the preceding embodiments, wherein the TRE sends a message indicating that the last validation took place before the expiry of the current round of period validation.

300. A method as in any one of the preceding embodiments, wherein there is no explicit signaling about the outcome of validation.

301. A method as in any one of the preceding embodiments, wherein the M2M1E starts-up to a predefined secure state.

302. A method as in any one of the preceding embodiments, wherein the M2ME requests that the TRE generate evidence of the platform validity.

303. A method as in any one of the preceding embodiments, wherein the TRE collects material to be used to produce evidence of the platform validity from the rest of the M2ME.

304. A method as in any one of the preceding embodiments, wherein evidence includes security-critical executable code, credentials for the M2ME's operating system, and equipment ids.

305. A method as in any one of the preceding embodiments, wherein the TRE generates the evidence for the validation of the M2ME and cryptographically protects it for integrity and confidentiality.

306. A method as in any one of the preceding embodiments, wherein the M2ME forwards the protected evidence to the PVA.

307. A method as in any one of the preceding embodiments, wherein the PVA receives the protected evidence and evaluates the evidence to determine if the M2ME is trustworthy enough to continue to perform authentication and download MIDs.

308. A method as in any one of the preceding embodiments, wherein a binding between the M2ME validation and authentication is performed.

309. A method as in any one of the preceding embodiments, wherein the binding includes a certificate or credential of the M2ME which attests to the secure state of the M2ME.

310. A method as in any one of the preceding embodiments, wherein the binding includes a more secure means of certification.

311. A method as in any one of the preceding embodiments, wherein the M2ME is authenticated by the ICF as a prerequisite for initial network connectivity.

312. A method as in any one of the preceding embodiments, wherein a M2ME is authenticated by the DPF to prove it contains an authenticated TRE before downloading a MID.

313. A method as in any one of the preceding embodiments, wherein the M2ME is authenticated by the SHO before operational network access.

314. A method as in any one of the preceding embodiments, wherein the binding of validity to network access authentication is implicit for autonomous validation.

315. A method as in any one of the preceding embodiments, wherein tokens are passed in the initial attachment messages which provide further information on the identity of the TRE.

316. A method as in any one of the preceding embodiments, wherein there is a logical binding of the TRE holding the authentication credentials to the M2ME.

317. A method as in any one of the preceding embodiments, wherein the integrity of the device platform is validated during authentication.

318. A method as in any one of the preceding embodiments, wherein there is a physical binding of the TRE to the M2ME.

319. A method as in any one of the preceding embodiments, wherein the integrity of the device platform is validated during TRE authentication.

320. A method as in any one of the preceding embodiments, wherein actual validation of the platform resources is performed by using functionality of a hardware security component securely embedded into the M2ME.

321. A method as in any one of the preceding embodiments, wherein actual validation of the platform resources is performed by using hardware security components that are outside of the TRE but whos security properties are assured by the TRE and which have a secure connection to the TRE.

322. A method as in any one of the preceding embodiments, wherein validation and authentication are combined in a session of common protocol.

323. A method as in any one of the preceding embodiments, wherein IKEv2 is used in a combined validation and authentication procedure.

324. A method as in any one of the preceding embodiments, wherein the ICF, DRF, and DPF are individual entities.

325. A method as in any one of the preceding embodiments, wherein the ICF, DRF, and DPF are combined.

326. A method as in any one of the preceding embodiments, wherein the downloading and provisioning of a MID to the M2ME occurs when the M2ME accesses a 3G VNO's network for initial network access.

327. A method as in any one of the preceding embodiments, wherein the VNO provides an air interface to the M2ME.

328. A method as in any one of the preceding embodiments, wherein the M2ME uses standard GSM/UMTS principles to decode network information and attach to the network of the VNO using an attach message.

329. A method as in any one of the preceding embodiments, wherein an attach message includes a provisional M2ME ID (PCID).

330. A method as in any one of the preceding embodiments, wherein the M2ME is authenticated using standard UMTS AKA procedures by the VNO.

331. A method as in any one of the preceding embodiments, wherein the VNO recognizes the PCID as a IMSI based on its content and structure.

332. A method as in any one of the preceding embodiments, wherein the M2ME and VNO support a common authentication algorithm.

333. A method as in any one of the preceding embodiments, wherein the common authentication algorithm is Milenage.

334. A method as in any one of the preceding embodiments, wherein the VNO, recognizing the PCID as and ID for the M2ME, contacts the ICF that will accept the PCID as a legitimate preliminary credential.

335. A method as in any one of the preceding embodiments, wherein the ICF issues a set of preliminary AVs to protect further communication with the M2ME, and starts to provide protected IP connectivity to the M2ME.

336. A method as in any one of the preceding embodiments, wherein the M2ME and the ICF perform a standard AKA process to produce preliminary AKA keys to protect communication with the M2ME.

337. A method as in any one of the preceding embodiments, wherein the ICF redirects the M2ME to the DPF.

338. A method as in any one of the preceding embodiments, wherein the ICF sends the PCID to the DRF.

339. A method as in any one of the preceding embodiments, wherein the DRF helps the M2ME find the SHO.

340. A method as in any one of the preceding embodiments, wherein the DRF connects to the SHO and registers the M2ME for connection to the SHO's network.

341. A method as in any one of the preceding embodiments, wherein the SHO requests the PVA to validate the authenticity and integrith of the TRE.

342. A method as in any one of the preceding embodiments, wherein the PVA validates the authenticity and integrity of the TRE.

343. A method as in any one of the preceding embodiments, wherein the PVA sends the validation results to the SHO.

344. A method as in any one of the preceding embodiments, wherein the SHO contacts the DPF and authorizes provisioning of the MID to the M2ME.

345. A method as in any one of the preceding embodiments, wherein the DPF downloads a MID to the M2ME.

346. A method as in any one of the preceding embodiments, wherein the M2ME provisions the downloaded MID into the TRE and reports status of the provisioning to the DPF.

347. A method as in any one of the preceding embodiments, wherein the M2ME sends a token for verification of the status message.

348. A method as in any one of the preceding embodiments, wherein the token is resistant to tampering and replay attacks.

349. A method as in any one of the preceding embodiments, wherein the DPF reports the status of the provisioning to the SHO.

350. A method as in any one of the preceding embodiments, wherein the downloading and provisioning of the MID to the M2ME occurs when the M2ME accesses a 3G VNO's network for initial network access.

351. A method as in any one of the preceding embodiments, wherein the ICF requests a PVA to validate the TRE before releasing provisional authentication vectors to the M2ME and before allowing an IP connectivity to the M2ME.

352. A method as in any one of the preceding embodiments, wherein the M2ME owner contacts a new SHO to transfer the M2ME parameters.

353. A method as in any one of the preceding embodiments, wherein the M2ME owner contacts the M2ME to initiate a re-provisioning.

354. A method as in any one of the preceding embodiments, wherein the new SHO requests a validation entity to validate the M2ME.

355. A method as in any one of the preceding embodiments, wherein the validation entity validates the M2ME and send results to the new SHO.

356. A method as in any one of the preceding embodiments, wherein the new SHO requests a DPF to download and provision the new MID to the M2ME.

357. A method as in any one of the preceding embodiments, wherein the DPF securely downloads the new MID package to the M2ME.

358. A method as in any one of the preceding embodiments, wherein the M2ME sends a message to the old SHO that the old MID has be discarded.

359. A method as in any one of the preceding embodiments, wherein the old SHO sends an ACK to the M2ME.

360. A method as in any one of the preceding embodiments, wherein the M2ME forwards the ACK to the DPF and the new SHO.

361. A method as in any one of the preceding embodiments, wherein the M2ME updates it system and installs the MID with the help fo the DPF.

362. A method as in any one of the preceding embodiments, wherein the M2ME sends status to the DPF.

363. A method as in any one of the preceding embodiments, wherein the DPF reports the status to the new SHO.

364. A method as in any one of the preceding embodiments, wherein the M2ME is put in a prestine state and runs an initial provisioning procedure.

365. A method as in any one of the preceding embodiments, wherein the PVA is responsible for ensuring that any software or firmware (SW/FW) update performed while the M2ME is still subscribed to the same SHo is done in a secure manner.

366. A method as in any one of the preceding embodiments, wherein the PVA or DPF supervises procedures such as secure on-air or on-wire downloading of SW/FW and re-provisioning of the M2ME or TRE.

367. A method as in any one of the preceding embodiments, wherein the PVA or DPF employs OMA DM and OMA FOTA procedures.

368. A method as in any one of the preceding embodiments, wherein the M2ME's trust state information is changed due to remote SW/FW update or reconfiguration.

369. A method as in any one of the preceding embodiments, wherein the PVA or DPF is configured to initiate and obtain the results of either a new verifiable boot or run-time trust-state information check of the M2ME or the TRE.

370. A method as in any one of the preceding embodiments, wherein the M2ME is configured to detect tampering.

371. A method as in any one of the preceding embodiments, wherein detecting tampering includes tamerping to any subsystem.

372. A method as in any one of the preceding embodiments, wherein tampering detection is performed with frequency.

373. A method as in any one of the preceding embodiments, wherein tempering events include one or more of remediable and/or un-remediable compromise of the OS by malware or viruses, buffer overflow events, sudden unexpected or unauthorized changes in radio or higher-layer connectivity characteristics and/or environmental readings, excessively repeated failure and/or denial of access or service by trusted network elements for the M2ME's requests for preliminary authentication, registration, or MID provisioning, or any unexpected/unauthorized change in a post-boot or run-time reading of trust state of the M2ME or M2ME subsystem relating to remote MID management functionality.

374. A method as in any one of the preceding embodiments, wherein other network elements are configured to detect tampering.

375. A method as in any one of the preceding embodiments, wherein the M2ME takes steps to limit damage in response to tamper detection.

376. A method as in any one of the preceding embodiments, wherein the M2ME is configured to disable remote MID management.

377. A method as in any one of the preceding embodiments, wherein the M2ME is configured to a report of the temper event to a designated network element.

378. A method as in any one of the preceding embodiments, wherein the M2ME is configured to perform remedial actions such as deleting, quarantining, or uninstalling recent software updates or suspected viruses or malware codes or data.

380. A method as in any one of the preceding embodiments, wherein the M2ME is configured to delete any pre-designated set of data related to remote MID management functions.

381. A method as in any one of the preceding embodiments, wherein the M2ME is configured power down the M2ME or a part or subsystem of the M2ME.

382. A method as in any one of the preceding embodiments, wherein network elements are configured to perform post tamper remedial measures.

383. A wireless transmit/receive unit (WTRU) configured to perform at least part of any one of the preceding embodiments.

384. A machine-to-machine (M2M) equipment configured to perform at least part of any one of the preceding embodiments.

385. A network entity configured to perform at least part of any one of the preceding embodiments.

What is claimed is:

1. In a system comprising a visited network operator (VNO), a registration operator (RO), and a machine-to-machine equipment (M2ME) having a trusted environment (TRE), wherein the VNO, RO, and M2ME communicate via a network, a method performed by the M2ME, the method comprising:
transmitting, to the VNO, a network attach request message comprising a temporary private identifier;
authenticating with the VNO using the temporary private identifier, the temporary private identifier being a provisional connectivity identification (PCID) valid for a validity period;
generating, by the TRE, security-critical executable code and sending the security-critical executable code to a platform verification authority;
receiving authentication vectors if the platform verification authority validates an integrity, using the security-critical executable code, of the TRE that is within the M2ME;
after the M2ME is authenticated with the VNO and after the TRE is validated by the platform verification authority, establishing IP connectivity with the RO via the VNO;
receiving a manageable identity (MID) from the RO;
provisioning the MID on the M2ME and reporting a success message to the RO; and
when the validity period expires, removing the PCID such that another M2ME can use the PCID.

2. The method of claim 1, the method further comprising:
validating the M2ME; and
based on the validation of the M2ME, sending a validation success message or a validation failure message to the platform verification authority via the VNO.

3. The method of claim 2, wherein the validation of the M2ME is at least partially determined based on a validation procedure performed by the trusted environment (TRE) within the M2ME.

4. The method of claim 3, wherein the validation procedure is performed autonomously within the M2ME.

5. The method of claim 3, where in the validation procedure is performed semi-autonomously by the M2ME.

6. The method of claim 1, wherein the MID comprises at least one of a universal mobile telecommunications (UMTS) subscriber identity module (USIM) function, credentials, or configuration information which enable the M2ME to authenticate with a selected home operator (SHO).

7. The method of claim 1, wherein the RO comprises an initial connectivity function (ICF), a discovery and registration function (DRF), and a download and provisioning function (DPF).

8. The method of claim 7, wherein the initial connectivity function (ICF), the discovery and registration function (DRF), and the download and provisioning function (DPF) are separate entities in the network.

9. A machine-to-machine equipment (M2ME) configured to communicate, via a network, with a visited network operator (VNO) and a registration operator (RO), the M2ME having a trusted environment (TRE), the M2ME comprising:
a memory comprising executable instructions; and
a processor in communication with the memory, the instructions, when executed by the processor, cause the processor to effectuate operations comprising:

transmitting, to the VNO, a network attach request message comprising a temporary private identifier;

authenticating with the VNO using the temporary private identifier, the temporary private identifier being a provisional connectivity identification (PCID) valid for a validity period;

generating, by TRE, security-critical executable code and sending the security-critical executable code to a platform verification authority;

receiving authentication vectors if the platform verification authority validates an integrity, using the security-critical executable code, of the TRE that is within the M2ME;

after the M2ME is authenticated with the VNO and after the TRE is validated by the platform verification authority, establishing IP connectivity with the RO via the VNO;

receiving a manageable identity (MID) from the RO;

provisioning the MID on the M2ME and reporting a success message to the RO; and when the validity period expires, removing the PCID such that another M2ME can use the PCID.

10. The M2ME of claim 9, wherein the processor is further configured to execute the instructions to perform operations comprising:

validating the M2ME; and based on the validation of the M2ME, sending a validation success message or a validation failure message to platform verification authority via the VNO.

11. The M2ME of claim 10, wherein the validation of the M2ME is at least partially determined based on a validation procedure performed by the trusted environment (TRE) within the M2ME.

12. The M2ME of claim 11, wherein the validation procedure is performed autonomously within the M2ME.

13. The M2ME of claim 11, where in the validation procedure is performed semi-autonomously by the M2ME.

14. The M2ME of claim 9, wherein the MID comprises at least one of a universal mobile telecommunications (UMTS) subscriber identity module (USIM) function, credentials, or configuration information which enable the M2ME to authenticate with a selected home operator (SHO).

15. The M2ME of claim 9, wherein the RO comprises an initial connectivity function (ICF), a discovery and registration function (DRF), and a download and provisioning function (DPF).

16. The M2ME of claim 15, wherein the initial connectivity function (ICF), the discovery and registration function (DRF), and the download and provisioning function (DPF) are separate entities in the network.

* * * * *